(12) United States Patent
Tyagi et al.

(10) Patent No.: US 8,435,712 B2
(45) Date of Patent: May 7, 2013

(54) DEVELOPER FOR SELECTIVE PRINTING OF RAISED INFORMATION BY ELECTROGRAPHY

(75) Inventors: Dinesh Tyagi, Fairport, NY (US); Patrick M. Lambert, Rochester, NY (US); Mark C. Zaretsky, Rochester, NY (US); Thomas N. Tombs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 669 days.

(21) Appl. No.: 12/124,544

(22) Filed: May 21, 2008

(65) Prior Publication Data

US 2009/0291274 A1    Nov. 26, 2009

(51) Int. Cl.
*G03G 9/00* (2006.01)

(52) U.S. Cl.
USPC .................................. 430/111.1; 430/111.31

(58) Field of Classification Search ............... 430/111.1, 430/111.3, 111.31, 111.32, 111.4
See application file for complete search history.

(56) References Cited

U.S. PATENT DOCUMENTS

| | | |
|---|---|---|
| 3,632,512 A | 1/1927 | Miller |
| 2,229,513 A | 1/1941 | Lustig |
| 3,716,630 A | 7/1970 | Shirk |
| 3,547,822 A | 12/1970 | Miller |
| 3,694,359 A | 9/1972 | Merrill et al. |
| 3,795,618 A | 3/1974 | Kasper |
| 3,809,554 A | 5/1974 | Merrill et al. |
| 3,850,663 A | 11/1974 | Hagenbach |
| 3,893,935 A | 7/1975 | Jadwin et al. |
| 3,898,170 A | 8/1975 | Kasper |
| 3,970,571 A | 7/1976 | Olson et al. |
| 4,042,518 A | 8/1977 | Jones |
| 4,076,857 A | 2/1978 | Kasper et al. |
| 4,079,014 A | 3/1978 | Burness et al. |
| 4,089,472 A | 5/1978 | Siegel et al. |
| 4,160,644 A | 7/1979 | Ryan |
| 4,323,634 A | 4/1982 | Jadwin |
| RE31,072 E | 11/1982 | Jadwin et al. |
| 4,385,823 A | 5/1983 | Kasper et al. |
| 4,394,430 A | 7/1983 | Jadwin et al. |
| 4,414,152 A | 11/1983 | Santilli et al. |
| 4,416,965 A | 11/1983 | Sandhu et al. |
| 4,473,029 A | 9/1984 | Fritz et al. |
| 4,478,925 A | 10/1984 | Miskinis |
| 4,545,060 A | 10/1985 | Arnon |
| 4,546,060 A | 10/1985 | Miskinis et al. |

(Continued)

FOREIGN PATENT DOCUMENTS

| | | |
|---|---|---|
| BE | 797132 | 9/1973 |
| EP | 0003905 | 10/1996 |

(Continued)

*Primary Examiner* — Stewart Fraser
(74) *Attorney, Agent, or Firm* — Roland R. Schindler

(57) ABSTRACT

The use of electrographic printing to prepare prints which have a desired tactile feel or raised information in a controlled manner by utilizing a developer having toner particle size larger than 50 microns volume average diameter and carrier particles larger than the toner particle size such that the volume average distribution overlap between the toner distribution curve and carrier particle distribution curve is less than 35% and the carrier and toner particles have a volume average diameter size differential equal to or greater than 5 microns or the ratio of carrier-to-toner volume average diameter exceeds 1.25.

13 Claims, 17 Drawing Sheets

U.S. PATENT DOCUMENTS

| | | | |
|---|---|---|---|
| 4,624,907 A | 11/1986 | Niimura et al. | |
| 4,683,188 A | 7/1987 | Suzuki et al. | |
| 4,780,553 A | 10/1988 | Suzuki et al. | |
| 4,814,250 A | 3/1989 | Kwarta et al. | |
| 4,833,060 A | 5/1989 | Nair et al. | |
| 4,834,920 A | 5/1989 | Bugner et al. | |
| 4,840,864 A | 6/1989 | Bugner et al. | |
| 5,215,854 A * | 6/1993 | Yamazaki et al. | 430/137.11 |
| 5,240,335 A | 8/1993 | Itoh et al. | |
| 6,165,667 A | 12/2000 | Takagi et al. | |
| 6,627,370 B2 * | 9/2003 | Tyagi et al. | 430/111.33 |
| 2006/0133870 A1 | 6/2006 | Ng et al. | |

FOREIGN PATENT DOCUMENTS

| | | |
|---|---|---|
| GB | 1420839 | 1/1976 |
| GB | 1501065 | 2/1978 |
| JP | 59 191070 | 10/1984 |
| JP | 08 063039 | 3/1996 |

* cited by examiner

TABLE 1

| SAMPLE | VOLUME AVERAGE DIAMETER (MICRONS) | SILICA | TITANIUM DIOXIDE |
|---|---|---|---|
| COMPARATIVE I | 14 | | |
| SAMPLE A | 14 | 0.4% R972 | |
| COMPARATIVE II | 21 | | |
| SAMPLE B | 21 | 0.4% R972 | 0.5% JMT 150 IB |
| COMPARATIVE III | 28 | | |
| SAMPLE C | 28 | 0.3% R972 | 0.4% JMT 150 IB |

FIG. 11

| TONER SAMPLE | TONER SIZE (m) | CARRIER SIZE (m) | Q/M (mC/g) | DUST (g) | % OVERLAP IN TONER AND CARRIER PSD | STACK HT. OF CLEAR (m) | CARRIER IN IMAGE | \|CARRIER-TONER\| SIZE DIFFERENTIAL (um) | SIZE RATIO: TONER/CARRIER |
|---|---|---|---|---|---|---|---|---|---|
| CONTROL I | 14 | 22 | −26 | 18.2 | 18 | − | NO | 8 | 1.6 |
| SAMPLE A | 14 | 22 | −19 | 0.2 | 18 | 12 | NO | 8 | 1.6 |
| SAMPLE A | 14 | 30 | −15 | 0.5 | 11 | 12 | NO | 16 | 2.1 |
| SAMPLE A | 14 | 40 | −12 | 1.7 | 3 | 12 | NO | 26 | 2.9 |
| CONTROL II | 21 | 22 | −17 | 8.7 | 45 | − | YES | 1 | 1.0 |
| SAMPLE B | 21 | 22 | −13 | 0.1 | 45 | 20 | YES | 1 | 1.0 |
| SAMPLE B | 21 | 30 | −10 | 0.2 | 24 | 20 | NO | 9 | 1.4 |
| SAMPLE B | 21 | 40 | −9 | 2.2 | 9 | 20 | NO | 19 | 1.9 |
| CONTROL III | 28 | 22 | −15 | 4.5 | 78 | − | YES | 6 | 0.8 |
| SAMPLE C | 28 | 22 | −8 | 0.2 | 78 | 35 | YES | 6 | 0.8 |
| SAMPLE C | 28 | 30 | −5 | 0.5 | 35 | 35 | YES | 2 | 1.1 |
| SAMPLE C | 28 | 40 | −5 | 0.2 | 13 | 35 | NO | 12 | 1.4 |

FIG. 14

DEVELOPER FOR SELECTIVE PRINTING OF RAISED INFORMATION BY ELECTROGRAPHY

FIELD OF THE INVENTION

This invention relates in general to developer useful for electrographic printing, and more particularly to physical requirements of toner and carrier particles in a two component system for selective printing of tactile feel, raised information by electrography.

BACKGROUND OF THE INVENTION

One common method for printing images on a receiver member is referred to as electrography. In this method, an electrostatic image is formed on a dielectric member by uniformly charging the dielectric member and then discharging selected areas of the uniform charge to yield an image-wise electrostatic charge pattern. Such discharge is typically accomplished by exposing the uniformly charged dielectric member to actinic radiation provided by selectively activating particular light sources in an LED array or a laser device directed at the dielectric member. After the image-wise charge pattern is formed, the pigmented (or in some instances, non-pigmented) marking particles are given a charge, substantially opposite the charge pattern on the dielectric member and brought into the vicinity of the dielectric member so as to be attracted to the image-wise charge pattern to develop such pattern into a visible image.

Thereafter, a suitable receiver member (e.g., cut sheet of plain bond paper) is brought into juxtaposition with the marking particle developed image-wise charge pattern on the dielectric member. A suitable electric field is applied to transfer the marking particles to the receiver member in the image-wise pattern to form the desired print image on the receiver member. The receiver member is then removed from its operative association with the dielectric member and subjected to heat and/or pressure to permanently fix the marking particle print image to the receiver member. Of course, plural marking particle images of, for example, different color particles respectively can be overlaid on one receiver member (before fixing) to form a multi-color print image on the receiver member.

In the earlier days of electrographic printing, the marking particles were relatively large (e.g., on the order of 10-15 μm). As a result the print image had a tendency to exhibit a relief appearance (variably raised surface). Under most circumstances, the relief appearance was considered an objectionable artifact in the print image. In order to improve image quality, and to reduce relief appearance, over the years, smaller marking particles (e.g., on the order of less than 8 μm) have been formulated and are more commonly used today.

With the improved print image quality, print providers and customers alike have been looking at ways to expand the use of electrographically produced prints. In certain classes of printing, a tactile feel to the print is considered to be highly desirable. Specifically, ultra-high quality printing such as for stationary headers, business cards, or greeting cards and invitations, utilize raised letter printing to give a tactile feel to the resultant print output. This is currently carried out in the off-set industry via thermography in an off-line process. Some other instances where tactile feel in the print would be desirable are Braille prints or print documents, which have security features provided there within. Presently however, printing documents with raised information so as to have a tactile feel with electrographic techniques, particularly with commonly used small size marking particles, has not been practical, and past printing techniques where large particles were used produced low quality images.

SUMMARY OF THE INVENTION

This invention is directed to developer useful for electrographic printing, and more particularly to physical requirements of toner and carrier particles in a two-component system for electrographic printing wherein raised information, with a distinct tactile feel, can be printed by electrographic techniques. Such electrographic printing includes the steps of forming a desired print image, electrographically, on a receiver member utilizing standard size marking particles; and in an area of the formed print image, where desired tactile feel, raised information is to be formed, selectively forming such tactile feel, raised information utilizing marking particles of a substantially larger size than the standard size marking particles of the desired print image.

In one embodiment a desired optimum performance is achieved when toner particle size is larger than 18 microns volume average diameter and preferably between 20 and 50 microns and more preferably between 20 and 30 microns volume average diameter, carrier particle size is larger than the toner particle size employed and ranges between 25 and 60 microns so that the overlap in the volume average distribution of toner and carrier particle size is less than 35% and either the difference between the volume average diameter for carrier and toner particles used is equal to or greater than 5 microns or the ratio of carrier-to-toner volume average diameter exceeds 1.25.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 11 shows a Table 1 identifying toners suitable for use with this invention.

FIG. 14 shows a Table II of developer suitable for use with this invention.

DETAILED DESCRIPTION OF THE INVENTION

In electrophotography, once the latent image has been developed and then transferred to the substrate, it needs to be fixed in order for it to be well adhered to the substrate. This can be done by a number of means such as radiant heating or by passing the image thru a pair of heated rollers. Of these, a pair of heated rollers is the most commonly used method for fixing an image. Generally, one of the rollers is heated to a higher temperature and may have an optional release fluid applied to its surface. This roller is usually referred to as the fuser roller. The other roller is typically heated to a much lower temperature and usually serves the function of applying pressure to the nip as the unfused image is passed through the nip of the two rollers. The second roller is typically referred to as a pressure roller. As the unfixed image is passed through a pair of heated rollers, the toner is softened as its temperature is increased on contact with the fuser roller. There is some spreading of the toner volume due to pressure and any void volume between toner particles is removed by the action of pressure and temperature. Unlike the off-set printing or ink jet applications, where most of the marking particles penetrate into the substrate fibers, the toner melt remains entirely above the paper substrate.

Figure 5:
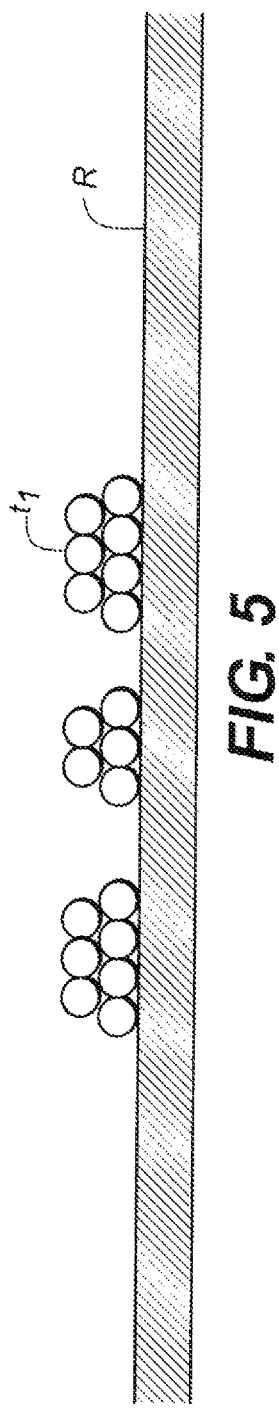
FIG. 5 is a schematic side elevational view, in cross section, of a receiver member having a marking particle print image formed thereon.

In a typical fusing step, the pile height of the toner laydown is reduced by approximately half the volume diameter of the toner as a result of spreading and elimination of the void space in between toner particles. Hence, when a uniform laydown of, for example, an 8-micron toner is fused, the resulting stack height is only about 4 microns. In thermography the appearance of relief is provided by utilizing large particles, which can result in a relief pattern that is greater than 20 microns over the paper base. In electrophotographic printing (EP), the toner development is typically limited to roughly a double layer due to counter charge issues, as shown in FIG. 5. Thus, in order to get an image having greater than 20 microns of relief, particles much larger than 8 microns are required. The basic premise for producing foreground raised information with a tactile feel is that the selected information will exhibit the desired tactile feel when the fused toner particle stack height T is at least 20 μm.

Figure 6:
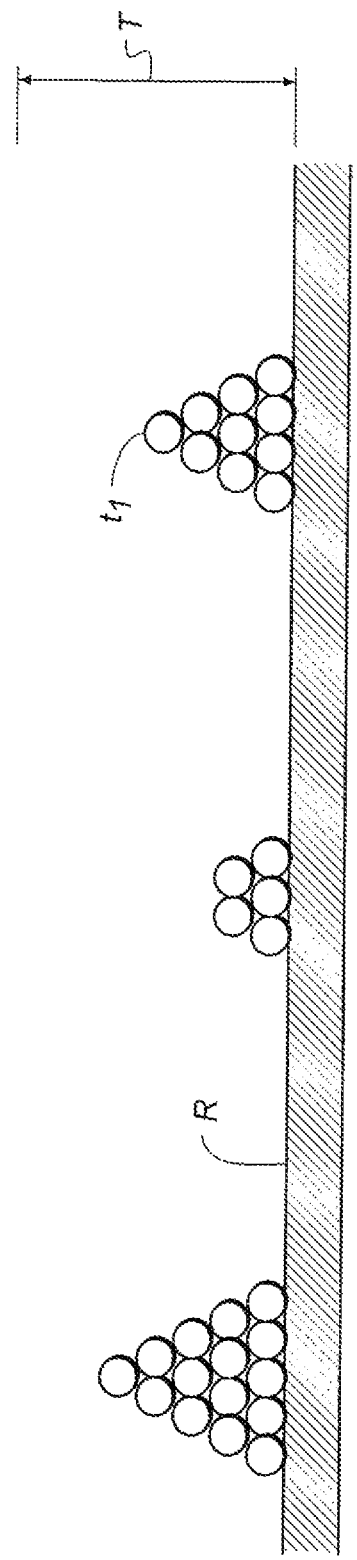
FIG. 6 is a schematic side elevational view, in cross section, of a receiver member having a marking particle print image formed thereon and, alternatively, similar size marking particles, in layers sufficient to form the tactile feel, raised information.
Figure 7:
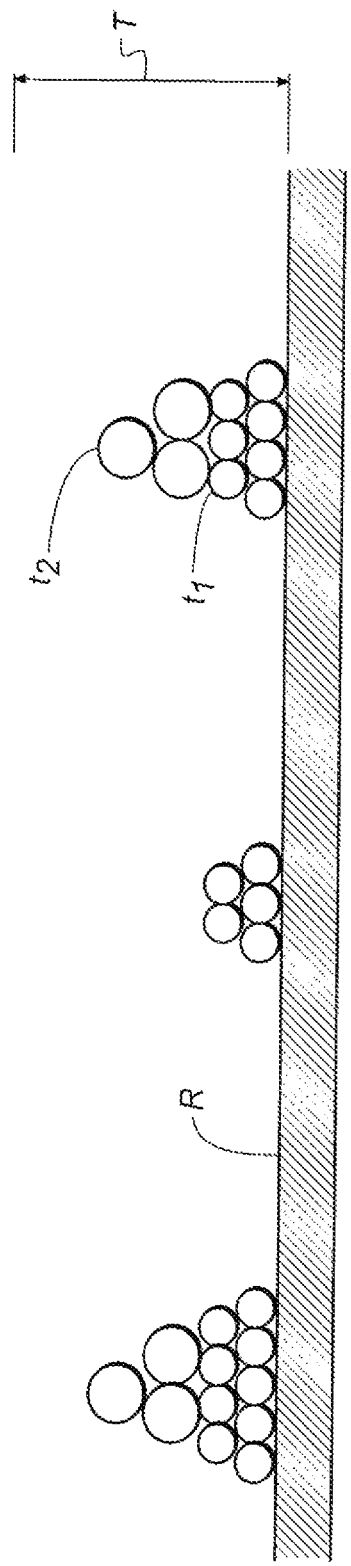
FIG. 7 is a schematic side elevational view, in cross section, of a receiver member having a marking particle print image formed thereon and larger size marking particles to form the tactile feel, raised information in the foreground of a print.
Figure 8:
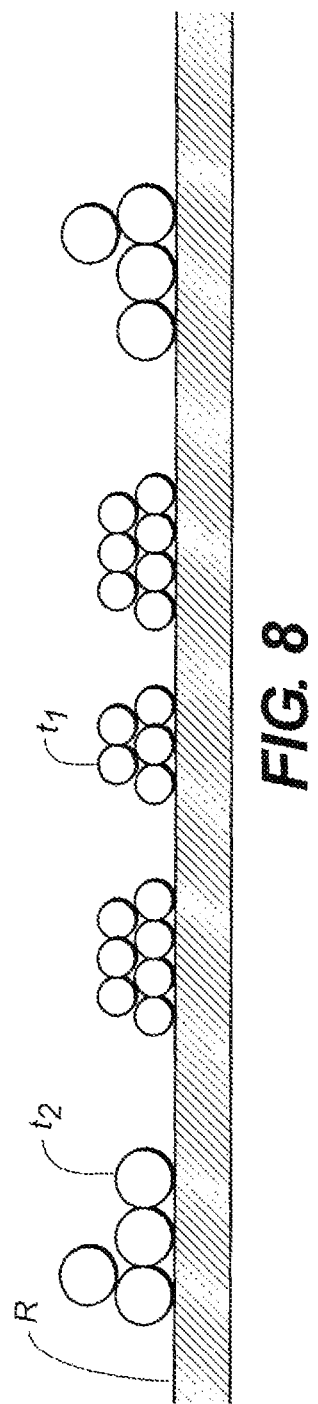
FIG. 8 is a schematic side elevational view, in cross section, of a receiver member having a marking particle print image formed thereon and larger size marking particles to form the tactile feel, raised information in the background of a print.

The stack height T can be produced using several imaging modules by selectively building up layer upon layer of toner particles $t_1$ of a standard general average mean volume weighted diameter of less than 9 μm, where each layer has a lay down coverage of about 0.4 to 0.5 mg/cm$^2$ (see FIG. 6). However, this would limit the number of available imaging modules for depositing other color toners. Using a larger size toner in an imaging module to more rapidly build up the toner mass laydown, and hence height, is a more practical method for producing high relief images. This larger toner may be deposited upon previously deposited layers of smaller sized toner for providing raised color image areas, as shown in FIG. 7. Or, the larger sized toner may be deposited in areas adjacent to the previously deposited layers of smaller sized toner for providing raised background areas such as may be desired to simulate a textured receiver, as shown in FIG. 8. Or, a combination of effects may be achieved by depositing the larger sized toner on both the background and previously toned areas.

When referring to toner particles, the toner size or diameter is defined in terms of the mean volume weighted diameter as measured by conventional diameter measuring devices such as a Coulter Multisizer, sold by Coulter, Inc. The mean volume weighted diameter is the sum of the mass of each toner particle multiplied by the diameter of a spherical particle of equal mass and density, divided by the total particle mass.

Figure 1:
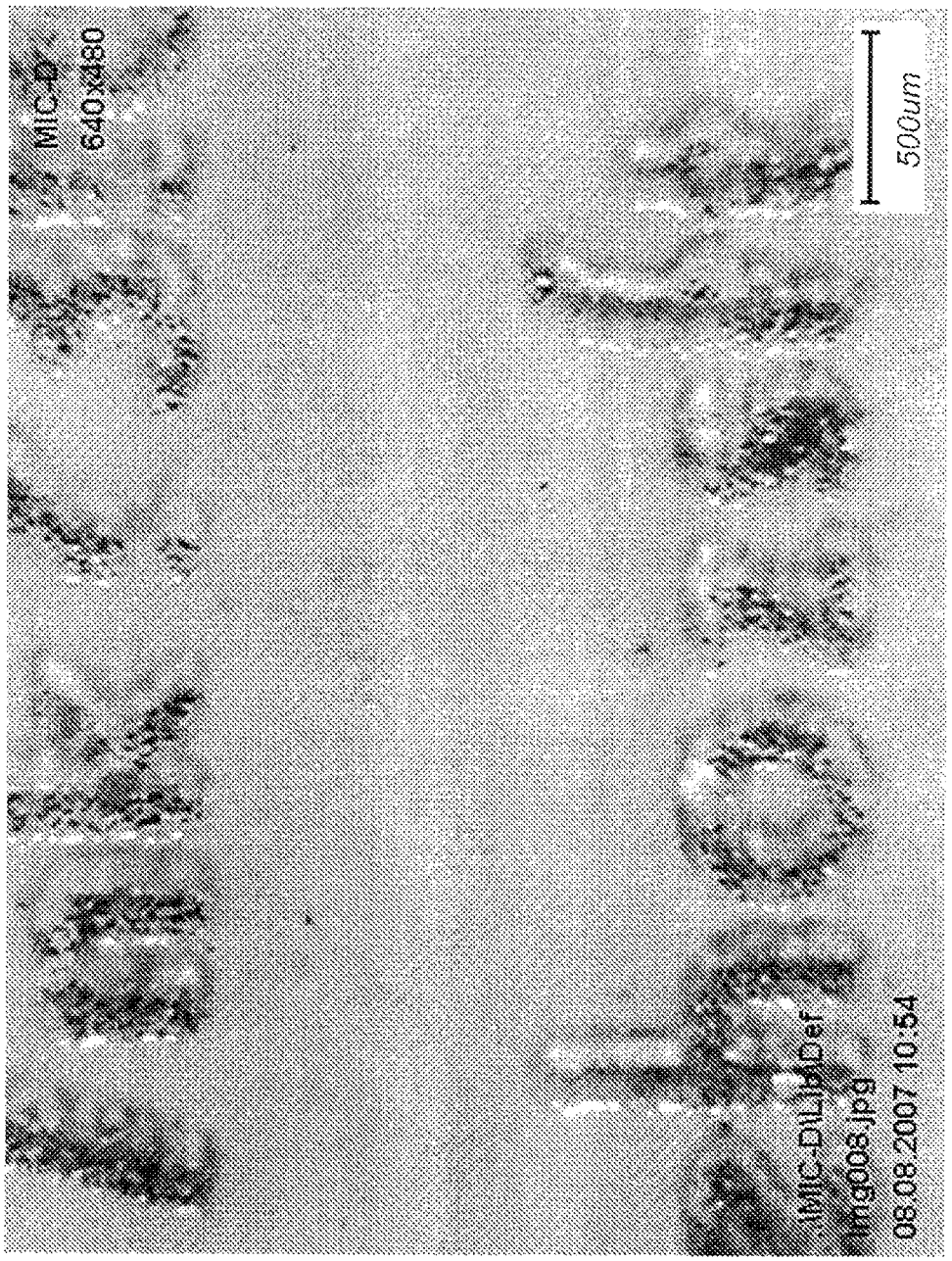
FIG. 1 is an optical micrograph of image showing the standard sized carrier being developed in the image area along with the larger size toner particles.

When a two-component developer comprising the above mentioned larger toner particles and a standard carrier are used, several problems were encountered. In order to obtain the highest image quality and improved addressability, the smallest carrier size is preferred. In a Small Particle Dry (SPD) development based on hard ferrite carrier particles, the volume average carrier particles in the range of 20 to 23 microns. When carrier particles in this size range were used with the larger toner particles that were about 20 microns in volume average diameter, the carrier particles tended to develop along with the toner in an image-wise fashion. This is shown in FIG. 1 where darker colored carrier particles are present with the large toner particles in the image text. When very large carrier particles were used, the image wise carry-out of carrier particles is avoided, but the precise registration of toner stack is compromised. In order to get the maximum tactile feel, it is necessary that more precise registration is maintained. After trying various particle size distribution of toner and carrier sizes, it was determined that the optimum performance was found when:

a) toner particle size is larger than 18 microns volume average diameter and preferably between 20 and 50 microns and more preferably between 20 and 30 microns volume average diameter;

b) carrier particle size is larger than the toner particle size employed and ranges between 25 and 60 microns;

c) difference between the volume average diameter for carrier and toner particles used is greater than 5 microns or the ratio of carrier-to-toner volume average diameter exceeds 1.25; and d) the overlap in the volume average distribution of toner and carrier particle size is less than 35%

Preferably, the toner formulations of the present invention are used in two component toner/developer systems.

In the present invention, one or more toner resins may be present in the toner particles or toner formulations of the present invention. The toner particles can be any conventional size and preferably have a median volume diameter of from about 18 microns to about 50 microns. The toner resin can be any conventional polymeric resin or combination of resins typically used in toner formulations using conventional amounts. The following discussion relates to optional components that can also be present in the toner particles or formulations of the present invention.

The polymers useful as toner binders in the practice of the present invention can be used alone or in combination and include those polymers conventionally employed in electrostatic toners. Useful amorphous polymers generally have a glass transition temperature within the range of from 50° C. to 120° C. Preferably, toner particles prepared from these polymers have relatively high caking temperature, for example, higher than about 60° C., so that the toner powders can be stored for relatively long periods of time at fairly high temperatures without having individual particles agglomerate and clump together. The melting point of useful crystalline polymers preferably is within the range of from about 65° C. to about 200° C. so that the toner particles can readily be fused to a conventional paper receiving sheet to form a permanent image. Especially preferred crystalline polymers are those having a melting point within the range of from about 65° C. to about 120° C. Of course, where other types of receiving elements are used, for example, metal plates such as certain printing plates, polymers having a melting point or glass transition temperature higher than the values specified above can be used.

Among the various polymers which can be employed in the toner particles of the present invention are polycarbonates, resin-modified maleic alkyd polymers, polyamides, phenol-formaldehyde polymers and various derivatives thereof, polyester condensates, modified alkyd polymers, aromatic polymers containing alternating methylene and aromatic units such as described in U.S. Pat. No. 3,809,554 and fusible crosslinked polymers as described in U.S. Pat. No. Re. 31,072.

Useful binder polymers include vinyl polymers, such as homopolymers and copolymers of styrene. Styrene polymers include those containing 40 to 100 percent by weight of styrene, or styrene homologs, and from 0 to 40 percent by weight of one or more lower alkyl acrylates or methacrylates. Other examples include fusible styrene-acrylic copolymers that are covalently lightly crosslinked with a divinyl compound such as divinylbenzene. Preferred binders comprise styrene and an alkyl acrylate and/or methacrylate and the styrene content of the binder is preferably at least about 60% by weight.

Copolymers rich in styrene such as styrene butylacrylate and styrene butadiene are also useful as binders as are blends of polymers. In such blends, the ratio of styrene butylacrylate to styrene butadiene can be 10:1 to 1:10. Ratios of 5:1 to 1:5 and 7:3 are particularly useful. Polymers of styrene butylacrylate and/or butylmethacrylate (30 to 80% styrene) and styrene butadiene (30 to 90% styrene) are also useful binders. A useful binder can also be formed from a copolymer of a vinyl aromatic monomer; a second monomer selected from either conjugated diene monomers or acrylate monomers such as alkyl acrylate and alkyl methacrylate.

Styrene polymers include styrene, alpha-methylstyrene, para-chlorostyrene, and vinyl toluene; and alkyl acrylates or methylacrylates or monocarboxylic acids having a double bond selected from acrylic acid, methyl acrylate, 2-ethylhexyl acrylate, 2-ethylhexyl methacrylate, ethyl acrylate, butyl acrylate, dodecyl acrylate, octyl acrylate, phenylacrylate, methylacrylic acid, ethyl methacrylate, butyl methacrylate and octyl methacrylate and are also useful binders. Also useful are condensation polymers such as polyesters and copolyesters of aromatic dicarboxylic acids with one or more aliphatic diols, such as polyesters of isophthalic or terephthalic acid with diols such as ethylene glycol, cyclohexane dimethanol, and bisphenols.

Typical useful toner polymers include certain polycarbonates such as those described in U.S. Pat. No. 3,694,359, which include polycarbonate materials containing an alkylidene diarylene moiety in a recurring unit and having from 1 to about 10 carbon atoms in the alkyl moiety. Other useful polymers having the above-described physical properties include polymeric esters of acrylic and methacrylic acid such as poly(alkyl acrylate), and poly(alkyl methacrylate) wherein the alkyl moiety can contain from 1 to about 10 carbon atoms.

Additionally, other polyesters having the aforementioned physical properties are also useful. Among such other useful polyesters are copolyesters prepared from terephthalic acid (including substituted terephthalic acid), a bis[(hydroxyalkoxy)phenyl]alkane having from 1 to 4 carbon atoms in the alkoxy radical and from 1 to 10 carbon atoms in the alkane moiety (which can also be a halogen-substituted alkane), and an alkylene glycol having from 1 to 4 carbon atoms in the alkylene moiety.

Typically, the amount of toner resin present in the toner formulation is from about 85 to about 95. Various kinds of well-known addenda (e.g., colorants, release agents, etc.) can also be incorporated into the toners of the invention.

An optional additive for the toner is a colorant. Numerous colorant materials selected from dyestuffs or pigments can be employed in the toner materials of the present invention. Such materials serve to color the toner and/or render it more visible. Of course, suitable toner materials having the appropriate charging characteristics can be prepared without the use of a colorant material where it is desired to have a developed image of low optical density. In those instances where it is desired to utilize a colorant, the colorants can, in principle, be selected from virtually any of the compounds.

In some cases the magnetic component, if present, acts as a colorant negating the need for a separate colorant. Suitable dyes and pigments are disclosed, for example, in U.S. Reissue Pat. No. 31,072 and in U.S. Pat. Nos. 4,160,644; 4,416,965; 4,414,152; and 2,229,513, all incorporated in their entireties by reference herein. Colorants are generally employed in the range of from about 1 to about 30 weight percent on a total toner powder weight basis, and preferably in the range of about 2 to about 15 weight percent. The toner particles can include one or more toner resins which can be optionally colored by one or more colorants by compounding the resin (s) with at least one colorant and any other ingredients. Although coloring is optional, normally a colorant is included and can be any of the materials mentioned in *Colour Index*, Volumes I and II, Second Edition, incorporated herein by reference.

With respect to the fuser release additives, the polyalkylene wax can also serve the purpose as a suitable release agent. Alternatively or in addition, a wax can be used that has a percent crystallinity of 70% or more as measured by DSC. Preferably, the percent crystallinity is 80 to 99%. The wax can be a polyalkylene wax or other types of waxes.

Furthermore, the wax preferably has a number average molecular weight of about 500 or higher and more preferably a number average molecular weight of from about 500 to about 7,000, and even more preferably a number average molecular weight of from about 1,000 to about 3,000. With respect to the polyalkylene wax, the polyalkylene wax can also serve the purpose as a suitable release agent. The polyalkylene wax, as indicated above, has a polydispersity of 2.0 or higher. Alternatively, the polyalkylene wax has a number average molecular weight of from about 500 or higher polydispersity number. More preferably, the polyalkylene wax that is present has a polydispersity of from 2.0 to about 10.0 and more preferably a polydispersity of from 3.0 to about 5.0. The polydispersity is a number representing the weight average molecular weight of the polyalkylene wax divided by the number average molecular weight of the polyalkylene wax.

In addition, the wax of the present invention preferably has a melting temperature onset of from about 70° C. to about 130° C. The melting temperature onset is calculated by identifying the temperature at which a melting transition is exhibited first in a Differential Scanning Calorimeter (DSC) scan by showing a departure from the baseline. DSC scans were obtained using a Perkin Elmer DSC 7. A toner weight of 10 to 20 mg was used at a heating and cooling rate of 10° C. per minute.

Preferably, the wax that is present in the toner formulations of the present invention has all four of the above-described properties or can have one, two, or three of the properties in any combination.

Examples of suitable polyalkylene waxes include, but are not limited to, polyethylene or polypropylene, such as Peterolite Polywax 500, Polywax 1000, Clariant Licowax PE130, Licowax PE190, Viscol 550 or 660 from Sanyo and the like. Also useful are ester waxes available from Nippon Oil and Fat under the WE-series waxes.

The amount of the wax that is present in the toner formulations of the present invention can be any suitable amount to accomplish the benefits mentioned herein. Examples of suitable amounts include, but are not limited to, from about 0.1 to about 10 weight percent and more preferably from about 1 to about 6 weight percent based on the toner weight. Other suitable amounts are from about 1 part to about 5 parts based on a 100 parts by weight of the toner resin present. Though not necessary, other conventional waxes can be additionally present, such as other polyolefin waxes and the like.

As indicated above, at least one charge control agent can be present in the toner formulations of the present invention. The term "charge-control" refers to a propensity of a toner addendum to modify the triboelectric charging properties of the resulting toner. A very wide variety of charge control agents for positive and negative charging toners are available. Suitable charge control agents are disclosed, for example, in U.S. Pat. Nos. 3,893,935; 4,079,014; 4,323,634; 4,394,430; and British Patent Nos. 1,501,065 and 1,420,839, all of which are incorporated in their entireties by reference herein. Additional charge control agents which are useful are described in U.S. Pat. Nos. 4,624,907; 4,814,250; 4,840,864; 4,834,920; 4,683,188; and 4,780,553, all of which are incorporated in their entireties by reference herein. Mixtures of charge control agents can also be used. Particular examples of charge control agents include chromium salicylate organo-complex salts, and azo-iron complex-salts, an azo-iron complex-salt, particularly ferrate (1-), bis[4-[(5-chloro-2-hydroxyphenyl) azo]-3-hydroxy-N-phenyl-2-naphthalenecarboxamidato (2-)], ammonium, sodium, and hydrogen (Organoiron available from Hodogaya Chemical Company Ltd.).

Additional examples of suitable charge control agents include, but are not limited to, acidic organic charge control agents. Particular examples include, but are not limited to, 2,4-dihydro-5-methyl-2-phenyl-3H-pyrazol-3-one (MPP) and derivatives of MPP such as 2,4-dihydro-5-methyl-2-(2, 4,6-trichlorophenyl)-3H-pyrazol-3-one, 2,4-dihydro-5-methyl-2-(2,3,4,5,6-pentafluorophenyl)-3H-pyrazol-3-one, 2,4-dihydro-5-methyl-2-(2-trifluoromethylphenyl)-3H-pyrazol-3-one and the corresponding zinc salts derived therefrom. Other examples include charge control agents with one or more acidic functional groups, such as fumaric acid, malic acid, adipic acid, terephathalic acid, salicylic acid, fumaric acid monoethyl ester, copolymers of styrene/methacrylic acid, copolymers of styrene and lithium salt of methacrylic acid, 5,5'-methylenedisalicylic acid, 3,5-di-t-butylbenzoic acid, 3,5-di-t-butyl-4-hydroxybenzoic acid, 5-t-octylsalicylic acid, 7-t-butyl-3-hydroxy-2-napthoic acid, and combinations thereof. Still other acidic charge control agents which are considered to fall within the scope of the invention include N-acylsulfonamides, such as, N-(3,5-di-t-butyl-4-hydroxybenzoyl)-4-chlorobenzenesulfonamide and 1,2-benzisothiazol-3(2H)-one 1,1-dioxide.

Another class of charge control agents include, but are not limited to, iron organo metal complexes such as organo iron complexes. A particular example is T77 from Hodogaya.

Preferably, the charge control agent is capable of providing a charge. For purposes of the present invention, a preferred consistent level of charge is from about −5 to about −12 micro C/gm.

The charge control agent(s) is generally present in the toner formulation in an amount to provide a consistent level of charge and preferably provide a consistent level of charge of from about −5 to about −12 micro C/gm in the toner formulation upon being charged. Examples of suitable amounts include from about ½ part to about 6 parts per 100 parts of resin present in the toner formulation.

With respect to the surface treatment agent, also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 1.5 weight percent, and more preferably from about 0.1 to about 1.0 weight percent, and most preferably from about 0.2 to 0.6 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, preferably uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention. The mixing conditions should be gentle enough such that the large toner particles are not fractured by the collision with the wall of the Henschel mixer as they are agitated by the mixing blade/propeller. At too high a mixing speed, generation of fines particles is often observed with these larger toner particles owing to their large mass.

The preferred spacing agent is silica, such as those commercially available from Degussa, like R972, RY200 or from Wacker, like H2000. Other suitable spacing agents include, but are not limited to, other inorganic oxide particles and the like. Specific examples include, but are not limited to, titania, alumina, zirconia, and other metal oxides; and also polymer beads preferably less than 1 µm in diameter (more preferably about 0.1 μm), such as acrylic polymers, silicone-based polymers, styrenic polymers, fluoropolymers, copolymers thereof, and mixtures thereof. These metal oxide particles can be optionally treated with a silane or silicone coating to alter their hydrophobic character. In the preferred embodiment, a mixture of hydrophobic silica is used along with the hydrophobic titania to provide the optimum results for charging behavior and powder flow properties.

The toner formulations can also contain other additives of the type used in conventional toners, including magnetic pigments, colorants, leveling agents, surfactants, stabilizers, and the like.

In a typical manufacturing process, the desired polymeric binder for toner application is produced independently. Polymeric binders for electrostatographic toners are commonly made by polymerization of selected monomers followed by mixing with various additives and then grinding to a desired size range. During toner manufacturing, the polymeric binder is subjected to melt processing in which the polymer is exposed to moderate to high shearing forces and temperatures in excess of the glass transition temperature of the polymer. The temperature of the polymer melt results, in part, from the frictional forces of the melt processing. The melt processing includes melt-blending of toner addenda into the bulk of the polymer.

The melt product is cooled and then pulverized to a volume average particle size of from about 18 to 50 micrometers. It is generally preferred to first grind the melt product prior to a specific pulverizing operation. The grinding can be carried out by any convenient procedure. For example, the solid toner can be crushed and then ground using, for example, a fluid energy or jet mill, such as described in U.S. Pat. No. 4,089,472, and can then be classified in one or more steps. The size of the particles is then further reduced by use of a high shear pulverizing device such as a fluid energy mill.

In place of melt blending or the like, the polymer can be dissolved in a solvent in which the charge control agent and other additives are also dissolved or are dispersed. The resulting solution can be spray dried to produce particulate toner powders. Limited coalescence polymer suspension procedures as disclosed in U.S. Pat. No. 4,833,060 are particularly useful for producing small sized, uniform toner particles. The toner formulation may also be made using various chemical methods known in the toner industry. Other methods include those well-known in the art such as spray drying, melt dispersion, and dispersion polymerization.

The shape of the toner particles can be any shape, regular or irregular, such as spherical particles, which can be obtained by spray-drying a solution of the toner resin in a solvent. Alternatively, spherical particles can be prepared by the polymer bead swelling techniques, such as those described in European Patent No. 3905 published Sep. 5, 1979, which is incorporated in its entirety by reference herein.

To be utilized as toners in the electrostatographic developers of the invention, the toners of this invention can be mixed with a carrier vehicle. The carrier vehicles, which can be used with the present toners to form the new developer can be selected from a variety of materials. Such materials include carrier core particles and core particles overcoated with a thin layer of a film-forming resin.

The carrier core materials can comprise conductive, non-conductive, magnetic, or non-magnetic materials. For example, carrier cores can comprise glass beads; crystals of inorganic salts such as aluminum potassium chloride; other salts such as ammonium chloride or sodium nitrate; granular zircon; granular silicon; silicon dioxide; hard resin particles such as poly(methyl methacrylate); metallic materials such as iron, steel, nickel, carborundum, cobalt, oxidized iron; or mixtures or alloys of any of the foregoing. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See, for example, U.S. Pat. Nos. 4,042,518; 4,478,925; and 4,546,060. The preferred hard magnetic carrier particles can exhibit a coercivity of at least about 300 gauss when magnetically saturated and also exhibit an induced magnetic moment of at least about 20 EMU/gm when in an externally applied field of 1,000 gauss. The magnetic carrier particles can be binder-less carriers or composite carriers. Useful hard magnetic materials include ferrites and gamma ferric oxide.

In one preferred embodiment, the carrier particles are composed of ferrites, which are compounds of magnetic oxides containing iron as a major metallic component. For example, compounds of ferric oxide, $Fe_2O_3$, formed with basic metallic oxides such as those having the general formula $MFeO_2$ or $MFe_2O_4$ wherein M represents a mono- or di-valent metal and the iron is in the oxidation state of +3. Preferred ferrites are those containing barium and/or strontium, such as $BaFe_{12}O_{19}$, $SrFe_{12}O_{19}$, and the magnetic ferrites having the formula $MO.6 Fe_2O_3$, wherein M is barium, strontium, or lead as disclosed in U.S. Pat. No. 3,716,630 which is incorporated in its entirety by reference herein. The size of the magnetic carrier particles useful in the present invention can vary widely, and preferably have an average particle size of less than 100 microns, and more preferably have an average carrier particle size of from about 25 to about 50 microns.

As noted above, the carrier particles can be overcoated with a thin layer of a film-forming resin for the purpose of establishing the correct triboelectric relationship and charge level with the toner employed. Examples of suitable resins are the polymers described in U.S. Pat. Nos. 3,547,822; 3,632,512; 3,795,618; 3,898,170 and Belgian Pat. No. 797,132. Other useful resins are fluorocarbons such as polytetrafluoroethylene, poly(vinylidene fluoride), mixtures of these and copolymers of vinylidene fluoride and tetrafluoroethylene. See, for example, U.S. Pat. Nos. 4,545,060; 4,478,925; 4,076,857; and 3,970,571. Such polymeric fluorocarbon carrier coatings can serve a number of known purposes. One such purpose can be to aid the developer to meet the electrostatic force requirements mentioned above by shifting the carrier particles to a position in the triboelectric series different from that of the uncoated carrier core material, in order to adjust the degree of triboelectric charging of both the carrier and toner particles. Another purpose can be to reduce the frictional characteristics of the carrier particles in order to improve developer flow properties. Still another purpose can be to reduce the surface hardness of the carrier particles so that they are less likely to break apart during use and less likely to abrade surfaces (e.g., photoconductive element surfaces) that they contact during use. Yet another purpose can be to reduce the tendency of toner material or other developer additives to become undesirably permanently adhered to carrier surfaces during developer use (often referred to as scumming). A further purpose can be to alter the electrical resistance of the carrier particles. Examples of other suitable resin materials for the carrier particles include, but are not limited to, silicone resin, fluoropolymers, polyacrylics, polymethacrylics, copolymers thereof, and mixtures thereof, other commercially available coated carriers, and the like.

A typical developer containing the above-described toner and a carrier vehicle generally comprises from about 1 to about 25 percent by weight of particulate toner particles and from about 75 to about 99 percent by weight carrier particles. Usually, the carrier particles are larger than the toner particles. Conventional carrier particles have a particle size on the order of from about 20 to about 200 micrometers. For the preferred hard ferrite carrier particles, the volume average particle size should range from 25 to 60 microns.

Developers in the development system of the present invention are preferably capable of delivering toner to a charged image at high mass flow rates and hence are particularly suited to high-volume electrophotographic printing applications and copying applications.

An additional embodiment of the present invention is a method to control or reduce toner "dust" levels in a development system. A fraction of toner does not reach sufficient level of tribocharge and is often thrown out from a rotating core and shell development roller when the electrostatic force is lower than the opposing centrifugal force. This referred to as "dust" and can be measured by the procedure described herein.

The toner and developer described can be used in a variety of ways to develop electrostatic charge patterns or latent images. Such developable charge patterns can be prepared by a number of means and be carried for example, on a light sensitive photoconductive element or a non-light-sensitive dielectric-surfaced element such as an insulator-coated conductive sheet. One suitable development technique involves cascading the developer across the electrostatic charge pattern, while another technique involves applying toner particles from a magnetic brush. This latter technique involves the use of a magnetically attractable carrier vehicle in forming the developer. After imagewise deposition of the toner particles, the image can be fixed, e.g., by heating the toner to cause it to fuse to the substrate carrying the toner. If desired, the unfused image can be transferred to a receiver such as a blank sheet of copy paper and then fused to form a permanent image.

In more detail, such a set up of the development system is available in a digital printer, such as NexPress 3000 digital printer using a development station comprising a non-magnetic, cylindrical shell, a magnetic core, and means for rotating the core and optionally the shell as described, for instance, in detail in U.S. Pat. Nos. 4,473,029 and 4,546,060, both incorporated in their entirety herein by reference. The development systems described in these patents can be adapted for use in the present invention. In more detail, the development systems described in these patents preferably use hard magnetic carrier particles.

The present invention further relates to the use of the above-described development system in developing electrostatic images with the toner of the present invention. The method involves contacting an electrostatic image with the toner of the present invention. For example, the method involves developing an electrostatic image member bearing an electrostatic image pattern by moving the image member through a development zone and transporting developer through the development zone in developing relation with the charge pattern of the moving imaging member by rotating an alternating-pole magnetic core of a pre-selected magnetic field strength within an outer non-magnetic shell, which can be rotating or stationary, and controlling the directions and speeds of the core and optionally the shell rotations so that developer flows through the development zone in a direction co-current with the image member movement, wherein an electrographic two-component dry developer is preferably used. The dry developer contains charged toner particles and oppositely charged carrier particles.

The electrostatic image so developed can be formed by a number of methods such as by imagewise photo decay of a photoreceptor or image-wise application of a charge pattern on the surface of a dielectric recording element. When photoreceptors are used, such as in high-speed electrophotographic copy devices, the use of half-tone screening to modify an electrostatic image is particularly desirable; the combination of screening with development in accordance with the method of the present invention producing high-quality images exhibiting high Dmax and excellent tonal range. Representative screening methods include those employing photoreceptors with integral half-tone screen, such as those described in U.S. Pat. No. 4,385,823, incorporated in its entirety by reference herein.

Figure 2:
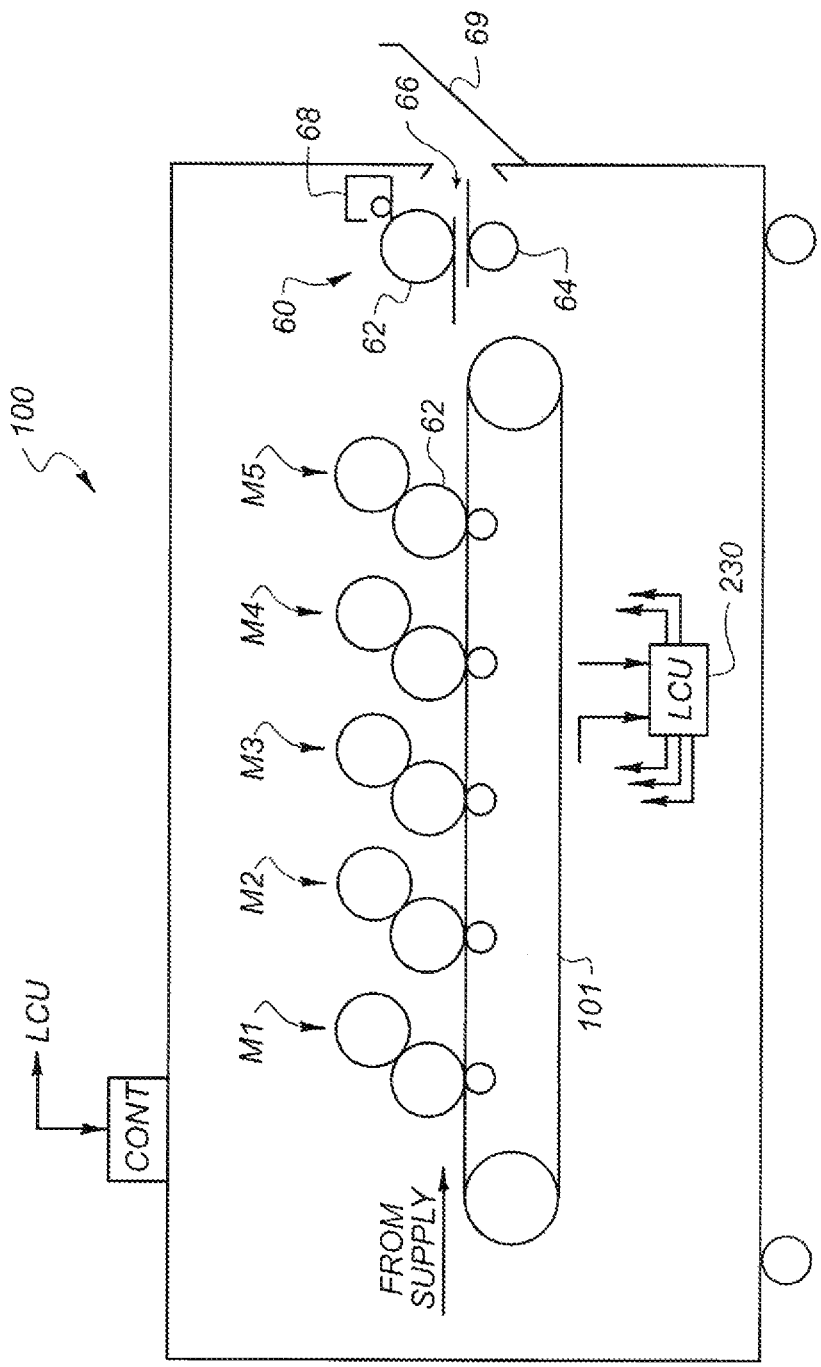
FIG. 2 is a schematic side elevational view, in cross section, of a typical electrographic reproduction apparatus suitable for use with this invention.
Figure 3:
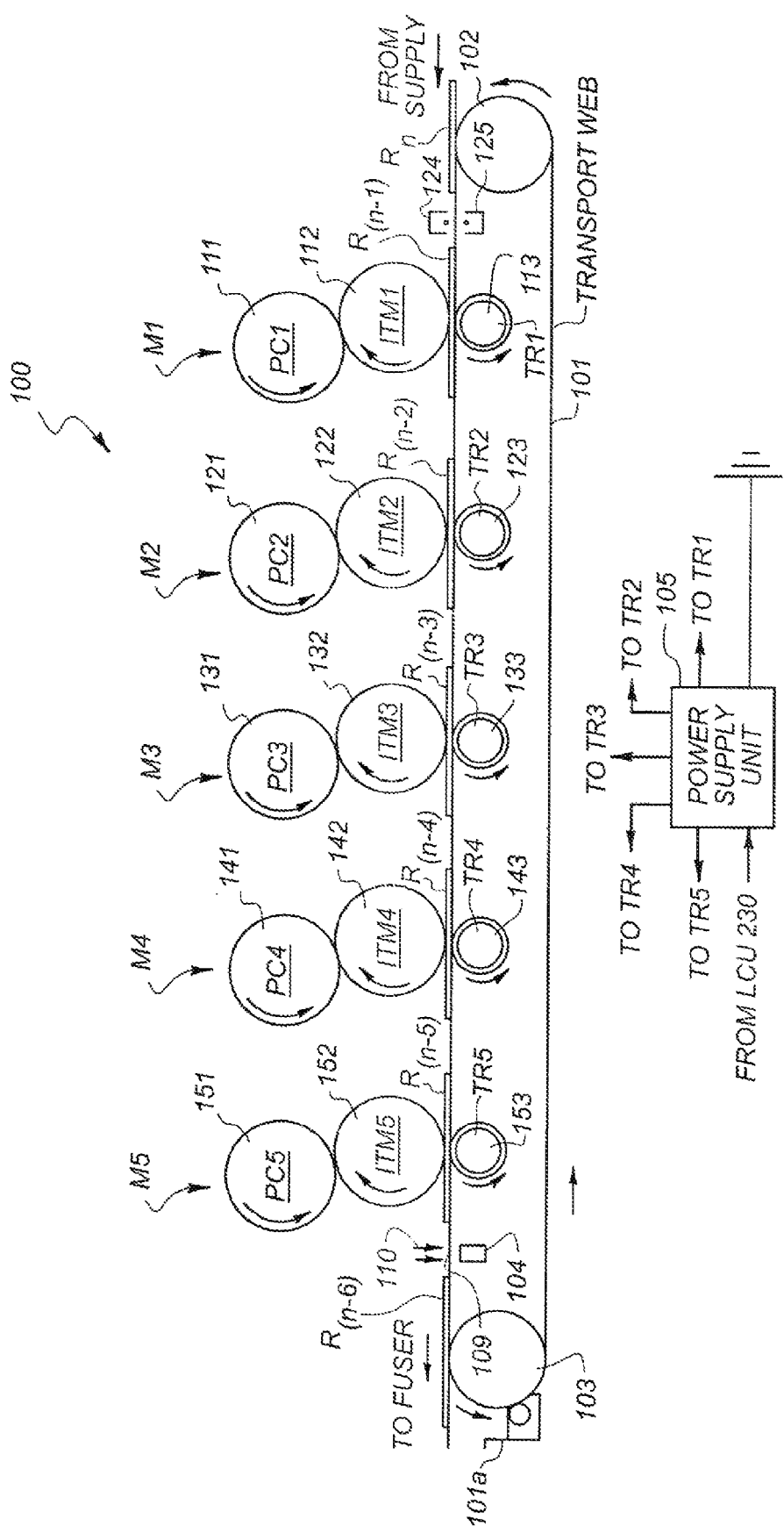
FIG. 3 is a schematic side elevational view, in cross section, of the reprographic image-producing portion of the electrographic reproduction apparatus of FIG. 2, on an enlarged scale.
Figure 4:
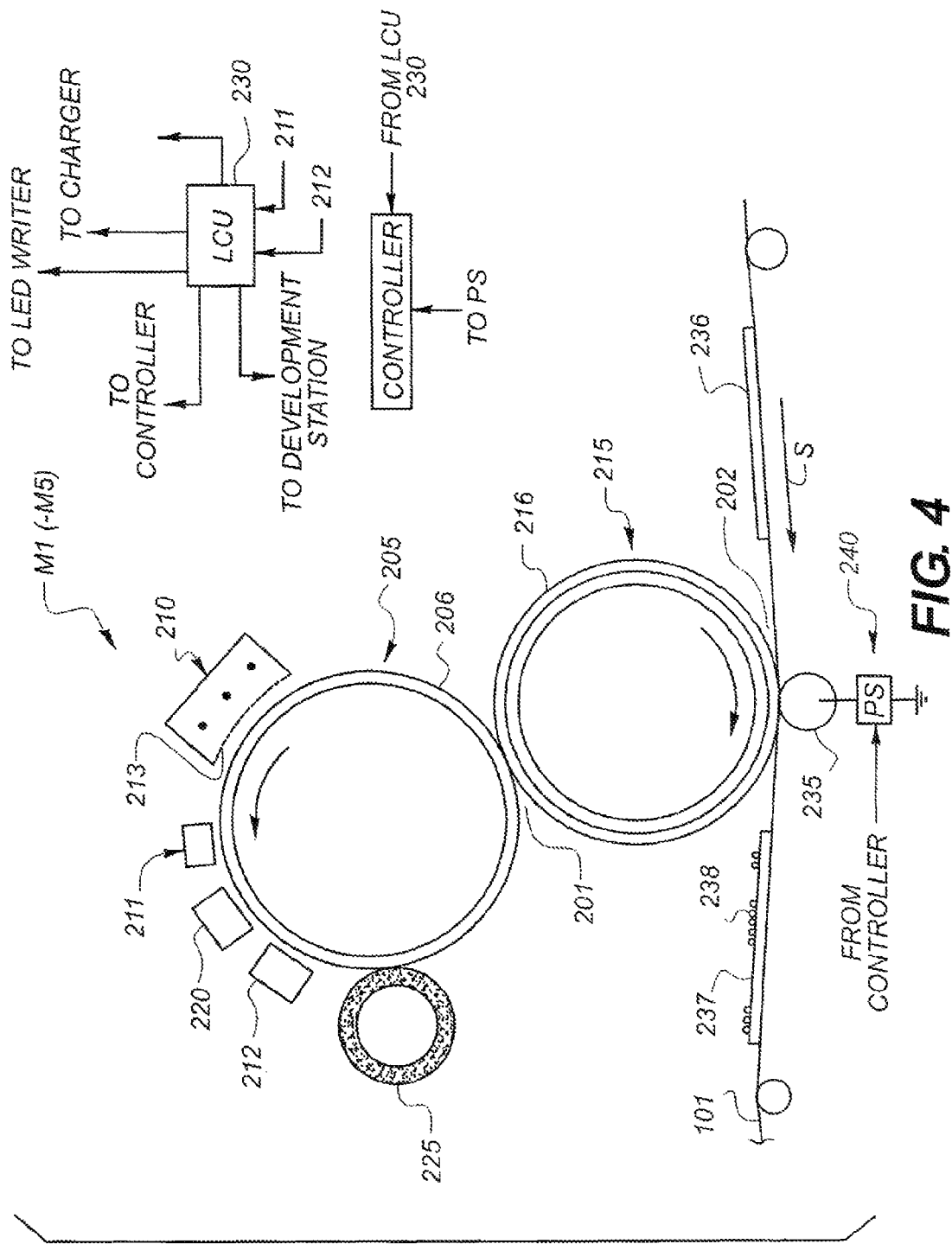
FIG. 4 is a schematic side elevational view, in cross section, of one printing module of the electrographic reproduction apparatus of FIG. 2, on an enlarged scale.

Referring now to the accompanying drawings, FIGS. 2-4 are side elevational views schematically showing portions of a typical electrographic print engine or printer apparatus suitable for printing of pentachrome images. Although one embodiment of the invention involves printing using an electrophotographic engine having five sets of single color image producing or printing stations or modules arranged in tandem, the invention contemplates that more or less than five colors may be combined on a single receiver member, or may include other typical electrographic writers or printer apparatus.

An electrographic printer apparatus 100 has a number of tandemly arranged electrostatographic image forming printing modules M1, M2, M3, M4, and M5. Each of the printing modules generates a single-color toner image for transfer to a receiver member successively moved through the modules. Each receiver member, during a single pass through the five modules, can have transferred in registration thereto up to five single-color toner images to form a pentachrome image. As used herein the term pentachrome implies that in an image formed on a receiver member combinations of subsets of the five colors are combined to form other colors on the receiver member at various locations on the receiver member, and that all five colors participate to form process colors in at least some of the subsets wherein each of the five colors may be combined with one or more of the other colors at a particular location on the receiver member to form a color different than the specific color toners combined at that location.

In a particular embodiment, printing module M1 forms black (K) toner color separation images, M2 forms yellow (Y) toner color separation images, M3 forms magenta (M) toner color separation images, and M4 forms cyan (C) toner color separation images. Printing module M5 may form a red, blue, green or other fifth color separation image. It is well known that the four primary colors cyan, magenta, yellow, and black may be combined in various combinations of subsets thereof to form a representative spectrum of colors and having a respective gamut or range dependent upon the materials used and process used for forming the colors. However, in the electrographic printer apparatus, a fifth color can be added to improve the color gamut. In addition to adding to the color gamut, the fifth color may also be used as a specialty color toner image, such as for making proprietary logos, or a clear toner for image protective purposes.

Receiver members ($R_n$-$R_{(n-6)}$ as shown in FIG. 3) are delivered from a paper supply unit (not shown) and transported through the printing modules M1-M5. The receiver members are adhered (e.g., preferably electrostatically via coupled corona tack-down chargers 124, 125) to an endless transport web 101 entrained and driven about rollers 102, 103. Each of the printing modules M1-M5 similarly includes a photoconductive imaging roller, an intermediate transfer member roller, and a transfer backup roller. Thus in printing module M1, a black color toner separation image can be created on the photoconductive imaging roller PC1 (111), transferred to intermediate transfer member roller ITM1 (112), and transferred again to a receiver member moving through a transfer station, which transfer station includes ITM1 forming a pressure nip with a transfer backup roller TR1 (113).

Similarly, printing modules M2, M3, M4, and M5 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). A receiver member, $R_n$, arriving from the supply, is shown passing over roller 102 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 60 (shown in FIG. 2).

A power supply unit 105 provides individual transfer currents to the transfer backup rollers TR1, TR2, TR3, TR4, and TR5 respectively. A logic and control unit 230 (FIG. 2) includes one or more computers and in response to signals from various sensors associated with the electrophotographic printer apparatus 100 provides timing and control signals to the respective components to provide control of the various components and process control parameters of the apparatus in accordance with well understood and known employments. A cleaning station 101a for transport web 101 is also typically provided to allow continued reuse thereof.

With reference to FIG. 4 wherein a representative printing module (e.g., M1 of M1-M5) is shown, each printing module of the electrographic printer apparatus 100 includes a plurality of electrographic imaging subsystems for producing a single color toned image. Included in each printing module is a primary charging subsystem 210 for uniformly electrostatically charging a surface 206 of a photoconductive imaging member (shown in the form of an imaging cylinder 205). An exposure subsystem 220 is provided for image-wise modulating the uniform electrostatic charge by exposing the photoconductive imaging member to form a latent electrostatic color separation image of the respective color. A development station subsystem 225 serves for toning the image-wise exposed photoconductive imaging member with toner of a respective color. An intermediate transfer member 215 is provided for transferring the respective color separation image from the photoconductive imaging member through a transfer nip 201 to the surface 216 of the intermediate transfer member 215 and from the intermediate transfer member 215 to a receiver member (receiver member 236 shown prior to entry into the transfer nip and receiver member 237 shown subsequent to transfer of the toned color separation image) which receives the respective toned color separation images in superposition to form a composite multicolor image thereon.

Subsequent to transfer of the respective color separation images, overlaid in registration, one from each of the respective printing modules M1-M5, the receiver member is advanced to a fusing assembly to fuse the multicolor toner image to the receiver member. Additional necessary components provided for control may be assembled about the various process elements of the respective printing modules (e.g., a meter 211 for measuring the uniform electrostatic charge, a meter 212 for measuring the post-exposure surface potential within a patch area of a patch latent image formed from time to time in a non-image area on surface 206, etc). Further details regarding the electrographic printer apparatus 100 are provided in U.S. Publication No. 2006/0133870, published on Jun. 22, 2006, in the names of Yee S, Ng et al.

Associated with the printing modules 200 is a main printer apparatus logic and control unit (LCU) 230, which receives input signals from the various sensors associated with the printer apparatus and sends control signals to the chargers 210, the exposure subsystem 220 (e.g., LED writers), and the development stations 225 of the printing modules M1-M5. Each printing module may also have its own respective controller coupled to the printer apparatus main LCU 230.

Subsequent to the transfer of the five color toner separation images in superposed relationship to each receiver member, the receiver member is then serially de-tacked from transport web 101 and sent in a direction to the fusing assembly 60 to fuse or fix the dry toner images to the receiver member. The transport web is then reconditioned for reuse by cleaning and providing charge to both surfaces (see FIG. 3), which neutralizes charge on the opposed surfaces of the transport web 101.

The electrostatic image is developed by application of pigmented marking particles (toner) to the latent image bearing photoconductive drum by the respective development station 225. Each of the development stations of the respective printing modules M1-M5 is electrically biased by a suitable respective voltage to develop the respective latent image, which voltage may be supplied by a common power supply or by individual power supplies (not illustrated). Preferably, the respective developer is a two-component developer that includes toner marking particles and magnetic carrier particles.

Each color development station has a particular color of pigmented toner marking particles associated respectively therewith for toning. Thus, each of the five modules creates a different color marking particle image on the respective photoconductive drum. As will be discussed further below, a non-pigmented (i.e., clear) toner development station may be substituted for one of the pigmented developer stations so as to operate in similar manner to that of the other printing modules, which deposit pigmented toner. The development station of the clear toner printing module has toner particles associated respectively therewith that are similar to the toner marking particles of the color development stations but without the pigmented material incorporated within the toner binder.

With further reference to FIG. 2, transport belt 101 transports the toner image carrying receiver members to a fusing or fixing assembly 60, which fixes the toner particles to the respective receiver members by the application of heat and pressure. More particularly, fusing assembly 60 includes a heated fusing roller 62 and an opposing pressure roller 64 that form a fusing nip therebetween. Fusing assembly 60 also includes a release fluid application substation generally designated 68 that applies release fluid, such as, for example, silicone oil, to fusing roller 62. The receiver members carrying the fused image are transported seriatim from the fusing assembly 60 along a path to either a remote output tray, or returned to the image forming apparatus to create an image on the backside of the receiver member (form a duplex print) for the purpose to be described below.

The logic and control unit (LCU) 230 includes a microprocessor incorporating suitable look-up tables and control software, which is executable by the LCU 230. The control software is preferably stored in memory associated with the LCU 230. Sensors associated with the fusing assembly provide appropriate signals to the LCU 230. In response to the sensors, the LCU 230 issues command and control signals that adjust the heat and/or pressure within fusing nip 66 and otherwise generally nominalizes and/or optimizes the operating parameters of fusing assembly 60 for imaging substrates.

Image data for writing by the printer apparatus 100 may be processed by a raster image processor (RIP), which may include a color separation screen generator or generators. The output of the RIP may be stored in frame or line buffers for transmission of the color separation print data to each of the respective LED writers K, Y, M, C, and R (which stand for black, yellow, magenta, cyan, and red respectively and assuming that the fifth color is red). The RIP and/or color separation screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer.

The RIP may perform image processing processes including color correction, etc. in order to obtain the desired color print. Color image data is separated into the respective colors and converted by the RIP to halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing.

According to this invention, the desire to print raised letter information, with a resultant tactile feel, can be accomplished with an electrographic reproduction apparatus, such as the apparatus 100 discussed above, by controlling the stack height T of toner particles t on a receiver member $R_n$ (see FIGS. 6-8). As discussed above, the raised letter information can have various applications such as for example providing foreground or primary images, such as Braille symbols, producing high quality printing such as stationary or business cards, giving documents a security feature, or providing background to images, such as desired surface characteristics for receiver members.

When printing raised information, especially when a substantially different size toner particle set is provided, in one electrographic module it may be advantageous to alter one or more electrographic process set-points, or operating algorithms, to optimize performance, reliability, and/or image quality of the resultant print. Examples of electrographic process set-point (or operating algorithms) values that may be controlled in the electrographic printer to alternate predetermined values when printing raised information include, for example: imaging voltage on the photoconductive member, toner particle development voltage, transfer voltage and transfer current. In addition, the set-points of the fixing assembly may also be altered for printing raised information, such as fusing temperature, fusing nip width, and fusing nip pressure. In an electrographic apparatus that produces raised information prints, a special mode of operation may be provided where the predetermined set-points (or control parameters or algorithms) are used when printing the raised information. That is, when the electrographic printing apparatus prints non-raised information images, a first set of set-points/control parameters are utilized. Then, when the electrographic printing apparatus changes mode to print raised information images, a second set of set-points/control parameters are utilized.

Alternatively, several layers of the standard size toner particles $t_1$ can be selectively covered in the desired raised information location with layers of toner particles $t_2$, of a larger general average mean volume weighted diameter of 12-50 µm (see FIG. 7). The larger toner particles are preferably clear (i.e., not pigmented) and have a lay down coverage of at least 1.5 mg/cm$^2$. Using small marking particles for the non-raised image is preferred because it allows for high quality images even when the large clear particles are deposited on top. Optionally, these larger toner particles may comprise one or more pigments or other additives to impart special hue or appearance.

The raised print can also be used to impart a desired, more overall background texture to the image, as described in U.S. Publication No. 2006/0187505, published on Aug. 24, 2006, in the names of Yee S, Ng et al. That is, using variable data, for example, from a database for the raised information enables the variable data printing of tactile images wherein the background texture may, for example, provide the appearance of a painter's canvas, an acrylic painting, a basketball (pigskin), sandstone, sandpaper, cloth, carpet, parchment, skin, fur, or wood grain. The resultant texture is preferably periodic, but can be random or unique. It is also preferable to create textures with a low frequency screening algorithm.

Using variable data for the raised information, for example from a suitable database, enables every printed page to contain unique information, with its own particular tactile feel. In order to improve reproduction of the colors in areas containing raised image effect, it may be desirable to build a new color profile based on the raised information.

There are several ways in which fifth image data may be generated for raised printing. The fifth module image data can be generated by the digital front end (DFE) from original CMYK color data that uses the inverse mask technique of U.S. Pat. No. 7,139,521, issued Nov. 21, 2006, in the names of Yee S, Ng et al which is incorporated by reference. The inverse mask for raised information printing is formed such that any rendered CMYK color pixel value with zero marking values will have a full strength (100%) fifth module pixel value generated. The fifth module image data is then processed with a halftone screen that renders a special texture. Accordingly, a special raised texture appearance will occur everywhere on the image (i.e., the foreground) where there is CMYK toner, but not in the background area.

In one alternative embodiment, a DFE can be utilized to store objects type information, such as text, line/graphics, or image types, to each rendered CYMK color pixel during raster image processing (RIPping). The fifth module imaging data will then be generated according to an operator's request for certain types of objects. For example, when only text object type is requested, the DFE will generate fifth image data only on the text object, while other object types will have zero values. This fifth image pixel will then be screened with halftone screens to generate the desired special texture. Here, the special raised texture will appear on the text objects while other objects will be normal (non-textured) in appearance.

In another alternative embodiment, the operator selected fifth image spot with special texture appearance is formed on top of CMYK/RGB image objects. The DFE renders fifth channel image data accordingly and sends the data to the press for printing. A special halftone screen (for example, a contone screen) in the press is configured to screen the fifth image data. As a result, the special texture will be printed with a raised appearance that conforms to the operator's choice.

In all of these approaches, a clear toner may be applied on top of a color image to form a three-dimensional texture. It should be kept in mind that textural information corresponding to the clear toner image plane need not be binary. In other words, the quantity of clear toner called for, on a pixel by pixel basis, need not only assume either 100% coverage or 0% coverage; it may call for intermediate "gray level" quantities, as well.

In an area of the colored image to be covered with a clear toner for three-dimensional texture, the color may change due to the application of the clear toner. For this approach, two color profiles are created. The first color profile is for 100% clear toner coverage on top, and the second color profile is for 0% clear toner coverage on top. On a pixel by pixel basis, proportional to the amount of coverage called for in the clear toner image plane, a third color profile is created, and this third color profile interpolates the values of the first and second color profiles. Thus, a blending operation of the two color profiles is used to create printing values. In a preferred embodiment, a linear interpolation of the two color profile values corresponding to a particular pixel is performed. It is understood, however, that some form of non-linear interpolation may be used instead. This technique is especially useful when the spatial frequency of the clear toner texture is low.

The second approach may be used when the spatial frequency of the clear toner texture is high. In such case, only one color profile may be needed for that textured image. One option is to simply use the ICC color profile of the original system for all textures, i.e., the ICC color profile that assumes there is no clear toner. In such case, we simply accept the fact that the appearance of the colored image will change a bit since the absolute color will differ from the calibrated color. However, there will not be an observable color difference within a uniform color region, even though the color is not quite accurate. A second option is to build a new ICC color profile with that particular three-dimensional clear toner texture surface. In this manner, the macro "color accuracy" problem is corrected, while the color artifact from pixel-to-pixel is not noticeable. Furthermore, a library of such texture-modified ICC color profiles may be built up over time for use whenever an operator wishes to add a previously defined texture to a profile, as discussed above. A computer software application implementing such a system may, for the second approach, automatically invoke just one of these two options, or may instead display a choice of the two options to an operator, perhaps with one of the options being the default.

Sample Preparation and Testing

A mixture of toner ingredients were first dry powder blended in a 40 liter Henschel mixer for 60 seconds at 1000 RPM to produce a homogeneous blend. A bisphenol-A based polyester from Reichhold Chemicals Corporation, commercially available as Atlac 382ES, was used as the toner binder polymer and was mixed with 2 pph of Orient Chemicals Bontron E-84 chare agent.

The powder blend was then melt compounded in a twin screw co-rotating extruder to melt the polymer binder and disperse the pigments, charge agents, and waxes. Melt compounding was done at a temperature of 230° F. (110° C.) at the extruder inlet, 230° F. (110° C.) increasing to 385° F. (196° C.) in the extruder compounding zones, and 385° F. (196° C.) at the extruder die outlet. The processing conditions were a powder blend feed rate of 10 kg/hr and an extruder screw speed of 490 RPM. The cooled extrudate was then chopped to approximately ⅛ inch size granules.

After melt compounding, the granules were then fine ground in an air jet mill to the desired particle sizes. The toner particle size distribution was measured with a Coulter Counter Multisizer and the medium volume weighted diameter was reported. The fine ground toner was then classified in a centrifugal air classifier to remove very small toner particles and toner fines that were not desired in the finished toner. After classification to remove fine particles, the toner had a fineness ratio, expressed as the ratio of the diameter at the 50% percentile to the 16% percentile of the cumulative particle number versus particle diameter, of 1.30 to 1.35.

The resulting mixture was pulverized to yield toner particles of sizes 14, 21, and 28 microns median volume weighted average diameter. The classified toner was then surface treated with fumed silica. A hydrophobic silica, designated R972 and manufactured by Nippon Aerosil, and a hydrophobic titanium dioxide particle designated JMT 150IB and manufactured by Tayca, were used. Subsequently, 2000 grams of toner were mixed with various amounts (grams) of each component to give a product containing different weight percent of each nanoparticle. The toner and silica were mixed in a 10 liter Henschel mixer with a 4 element impeller for 2 minutes at 2000 RPM. Careful attention was paid to ensure that the large toner particles did not create fines by breaking up during the surface treatment process owing to their large mass. A 21 microns toner particle has nearly 20 times the mass of an 8 micron counterpart while a 28 micron version is almost 42 times more heavy. Therefore, it is easy to see that unless care is taken during the materials handing step, generation of fine or smaller particles can easily take place.

The silica surface treated toner was sieved through a 230 mesh vibratory sieve to remove un-dispersed silica agglomerates and any toner flakes that may have formed during the surface treatment process.

These toners are identified in Table I, shown in FIG. 11, along with the volume average particle size of the core toner. The term "particle size" used herein, or the term "size" or "sized" as employed herein in reference to the term "particles", means the median volume weighted diameter as measured by conventional diameter measuring devices, such as a Coulter Multisizer, sold by Coulter, Inc. of Hialeah, Fla. Median volume weighted diameter is the diameter of an equivalent weight spherical particle which represents the median for a sample.

Tests with Developers Incorporating Toner Examples

Electrographic developers are prepared by mixing toner for this invention as described above with hard magnetic ferrite carrier particles coated with polymeric resin(s). Developers are made at a concentration of 10 weight percent toner, and 90 weight percent carrier particles. Carriers employed herein are hard magnetic ferrite carrier particles coated with a mixtures of poly(vinylidene fluoride) and poly(methyl methacrylate).

Charge and Dust Measurements

The developer is mixed on a device that simulates the mixing that occurs in a printer developer station to charge the toner particles. The toner Q/m ratio is measured in a MECCA device comprised of two spaced-apart, parallel, electrode plates which can apply both an electrical and magnetic field to the developer samples, thereby causing a separation of the two components of the mixture, i.e., carrier and toner particles, under the combined influence of a magnetic and electric field. A 0.100 g sample of a developer mixture is placed on the bottom metal plate. The sample is then subjected for thirty (30) seconds to a 60 Hz magnetic field and potential of 2000 V across the plates, which causes developer agitation. The toner particles are released from the carrier particles under the combined influence of the magnetic and electric fields and are attracted to and thereby deposit on the upper electrode plate, while the magnetic carrier particles are held on the lower plate. An electrometer measures the accumulated charge of the toner on the upper plate. The toner Q/m ratio in terms of microcoulombs per gram (μC/g) is calculated by dividing the accumulated charge by the mass of the deposited toner taken from the upper plate. In order to correctly predict the effect of toner formulation on charge with developer life, a developer at 20 percent toner concentration is first prepared. The developer is then allowed to exercise in the presence of a development roller in which the core is rotating at 2000 rpm. After 1 hour of exercise, the developer is removed and the toner is separated from the carrier by exposing the developer to high voltage of opposite polarity to toner. The stripped carrier is then rebuilt with fresh toner at 10 percent toner concentration. The developer is first wrist shaken for 2 minutes and "Fresh" charge is measured using the MECCA device. This developer is then placed on a magnetic roller where it is exercised for 10 minutes with magnetic core rotating at 2000 rpm. The "Aged" charged is measured again using MECCA.

In a printer, replenishment toner is added to the developer station to replace toner removed in the process of printing copies. This toner is uncharged and gains a triboelectric charge by mixing with the developer. During this mixing process any uncharged or low charged particles can become airborne and result in background on prints or dust contamination within the printer.

A "dusting test" is performed during experimentation to evaluate the potential for a replenishment toner to form background or dust. The 4 g developer sample at 8% toner concentration (3.2 g carrier+0.8 g toner) is exercised on a rotating shell and magnetic core developer station. After 10 minutes of exercising, 0.4 g of fresh uncharged replenishment toner was added to the developer. A fine filter over the developer station captures any airborne dust generated when the replenishment toner is added, and the dust collected is weighed as milligrams of dust per 0.4 grams of added replenishment toner. Lower values for this "dust" measurement correspond to a better toner performance. Typically, low values of dust (less than 10 milligrams per gram of fresh added toner), in addition to low levels of toner charge (−5 to −12.mu.C/g), are desirable.

Figure 12:
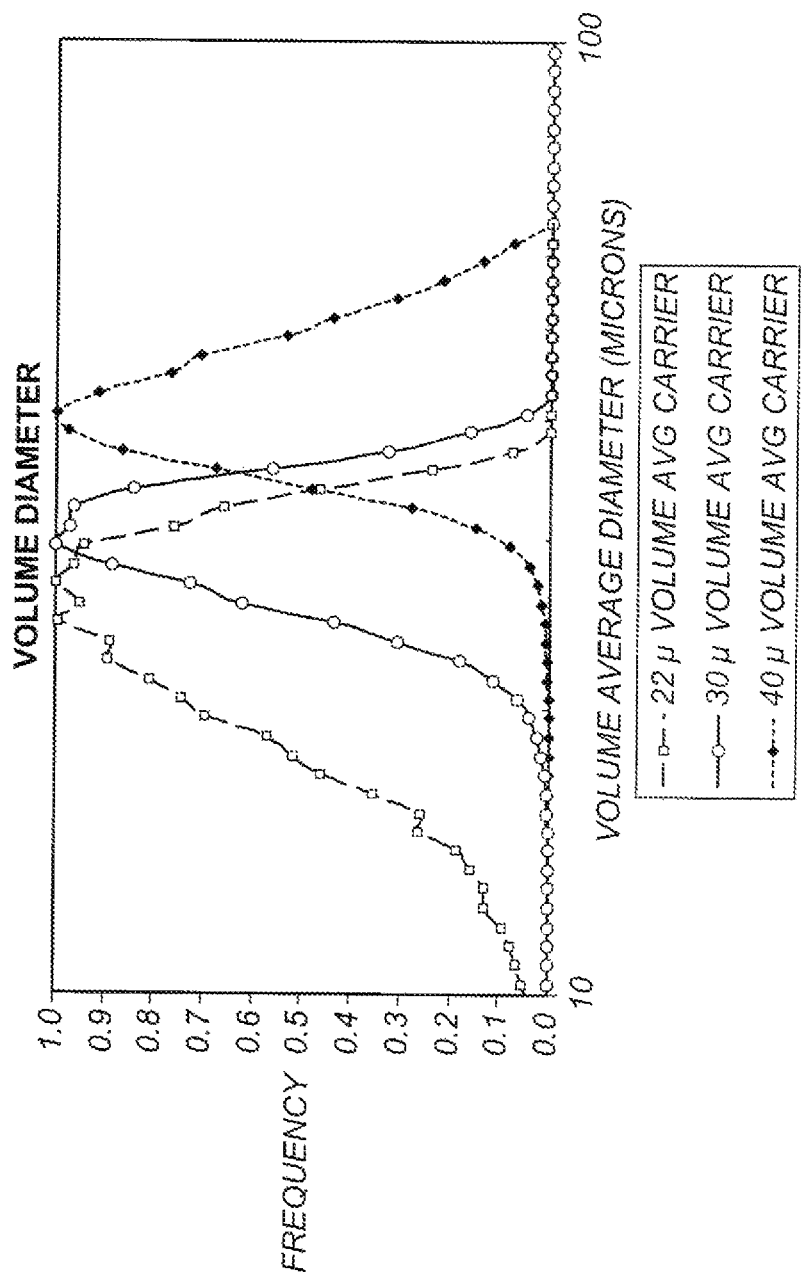
FIG. 12 is a particle size distribution of the various carrier particles sizes evaluated.
Figure 13:
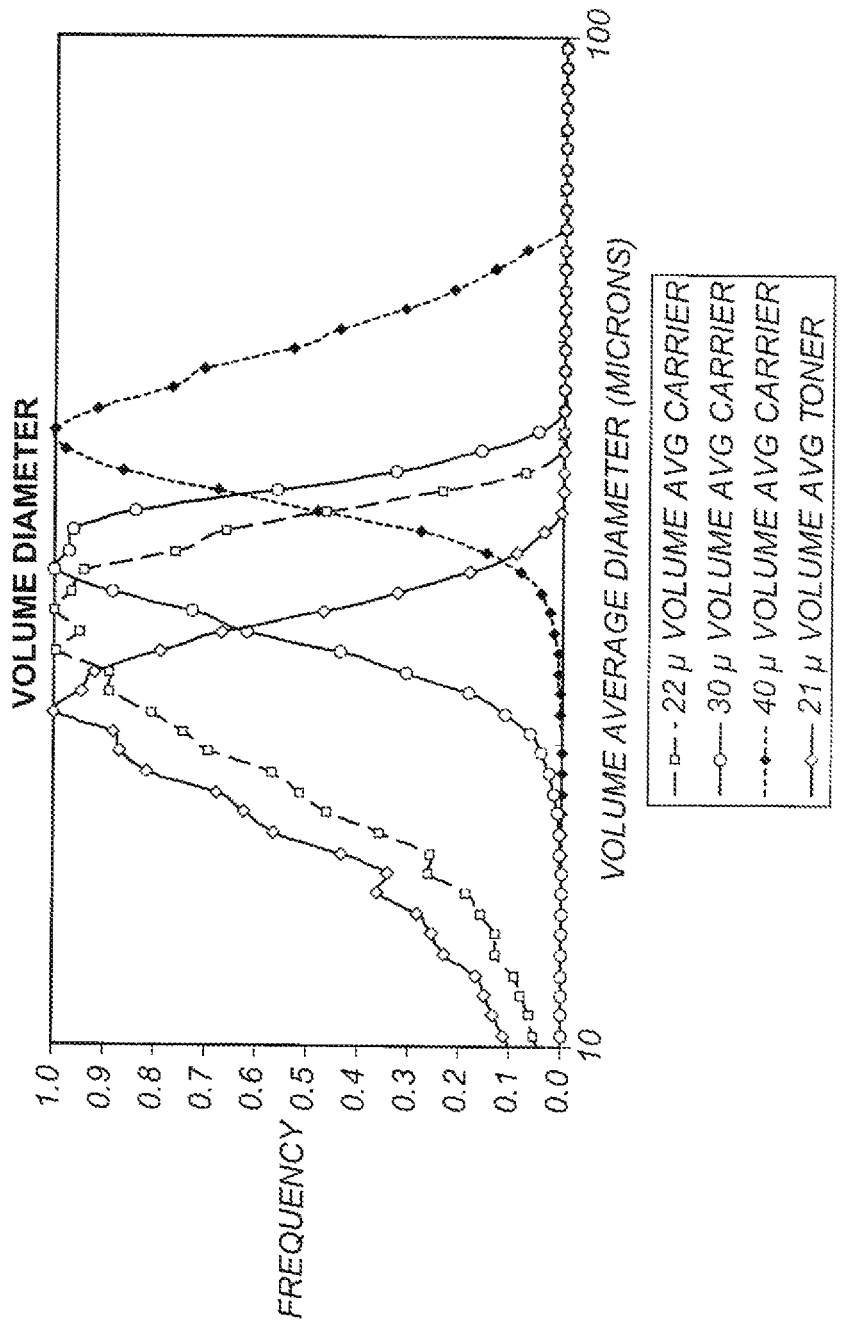
FIG. 13 is a particle size distribution of one of the toner and the three carriers showing various degrees of overlap in the volume weighted particle size distribution.

These toners were mixed with various carrier particles to prepare various developers. The size of the carrier particle was one of the variables being tested in these evaluations. The three carrier particle sizes used for evaluation were 22, 30, and 40 microns volume average diameter. Particle size distributions for the three carriers are shown in FIG. 12. The developer charging and dusting measurements were performed using the procedure described above. Particle size of both toner and carrier were measured and the percent overlap for the volume average distribution was measured using by measuring the common area for overlap as shown, for example, in FIG. 13. Developers were further tested in a NexPress 3000 printer and the text characters in the images were examined for carrier that might have been carried out in image wise fashion. The results of the testing are summarized in the Table II shown in FIG. 14.

Figure 15:
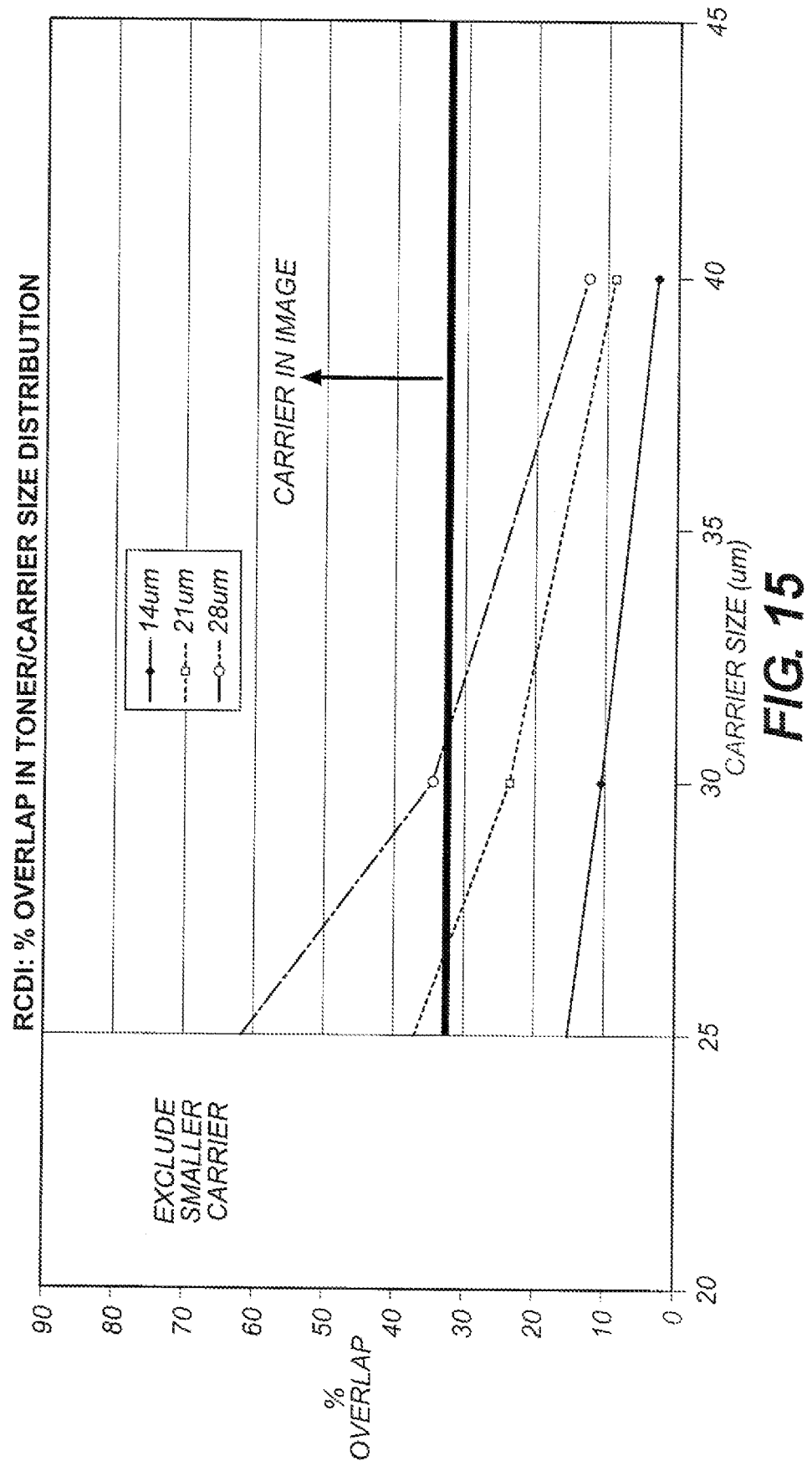
FIG. 15 illustrates an embodiment where there is less than 35% overlap criterion.
Figure 16:
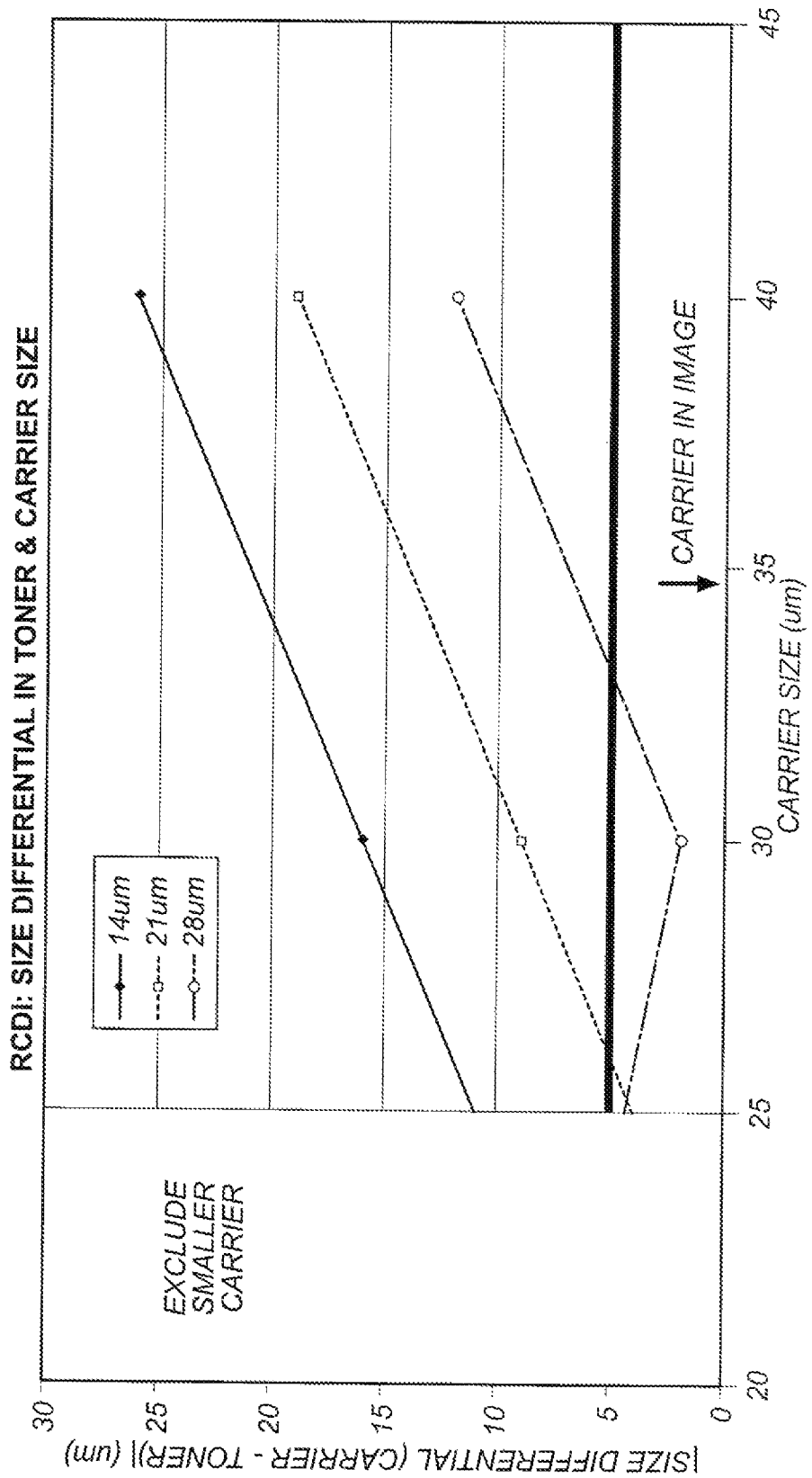
FIG. 16 illustrates an embodiment where the carrier and toner particles have a volume average diameter size differential equal to or greater than 5 microns and the volume average distribution overlap between the toner distribution curve and carrier particle distribution curve is less than 35%.
Figure 17:
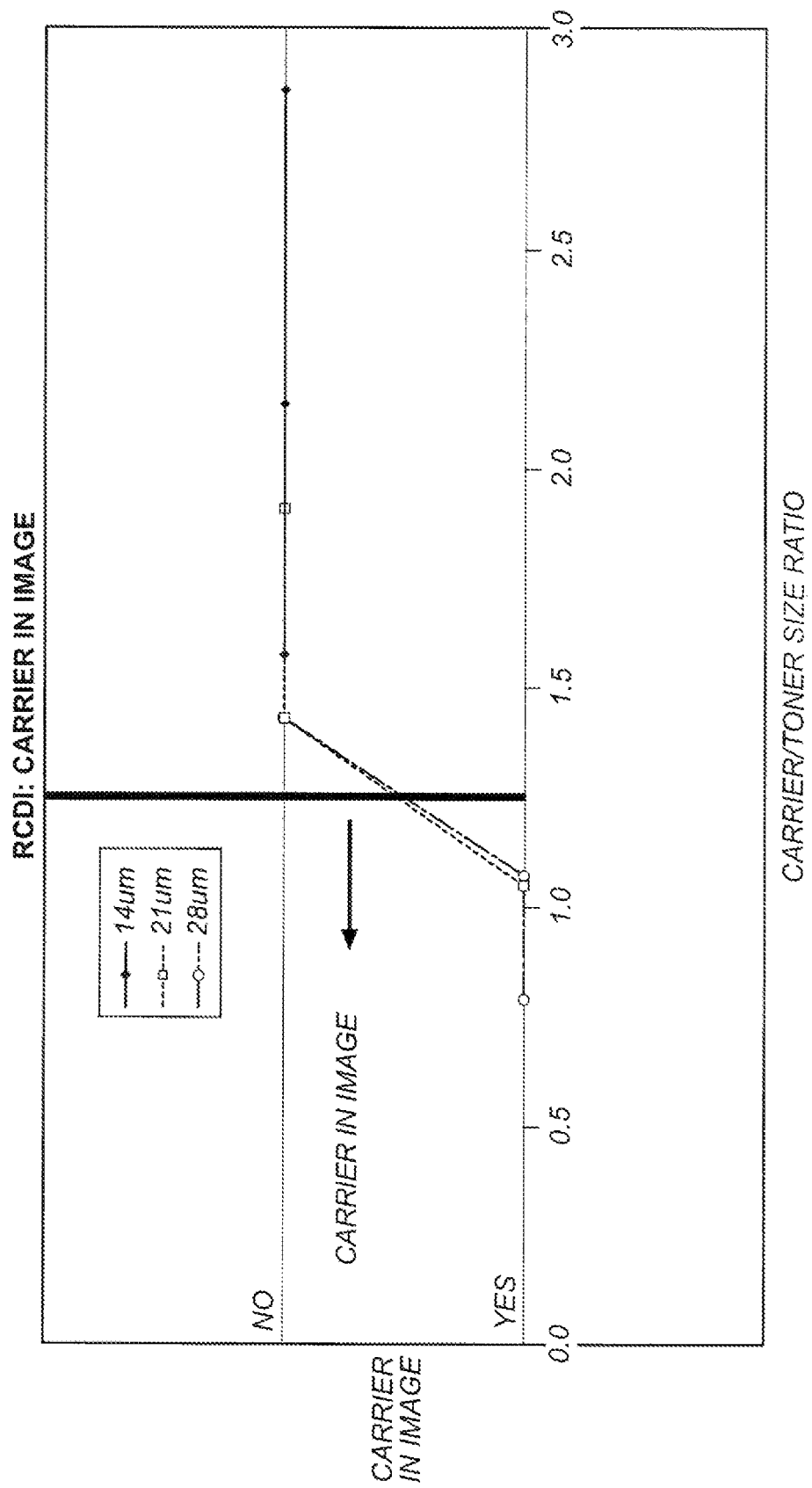
FIG. 17 illustrates an embodiment where the ratio of carrier-to-toner volume average diameter exceeds 1.25.

The graphs shown in FIGS. 15 to 17 illustrate the results discussed above for a few different embodiments. FIG. 15 shows a first graph that illustrates an embodiment where there is less than 35% overlap in the volume average distribution of toner and carrier particle size. FIG. 16 illustrates an embodiment where the carrier and toner particles have a volume average diameter size differential equal to or greater than 5 microns and the volume average distribution overlap between the toner distribution curve and carrier particle distribution curve is less than 35%. FIG. 17 illustrates an embodiment where the ratio of carrier-to-toner volume average diameter exceeds 1.25.

Of the samples above, control toners, which do not contain any surface treatment particles, such as fumed metal oxides, were not tested in the printer because of the excessive dusting. For these toners to perform correctly and to develop enough toner necessary to give the stack height sufficient for tactile feel, the surface treatment needs to be present on the surface not only to reduce dusting but also to control the charge to an acceptable range. As mentioned earlier, a stack height of roughly 20 microns or greater is necessary to provide a sufficiently pleasing tactile feel. As can be seen from Table II (FIG. 14). Sample A toner (14 microns) was not able to meet this need.

Figure 9:
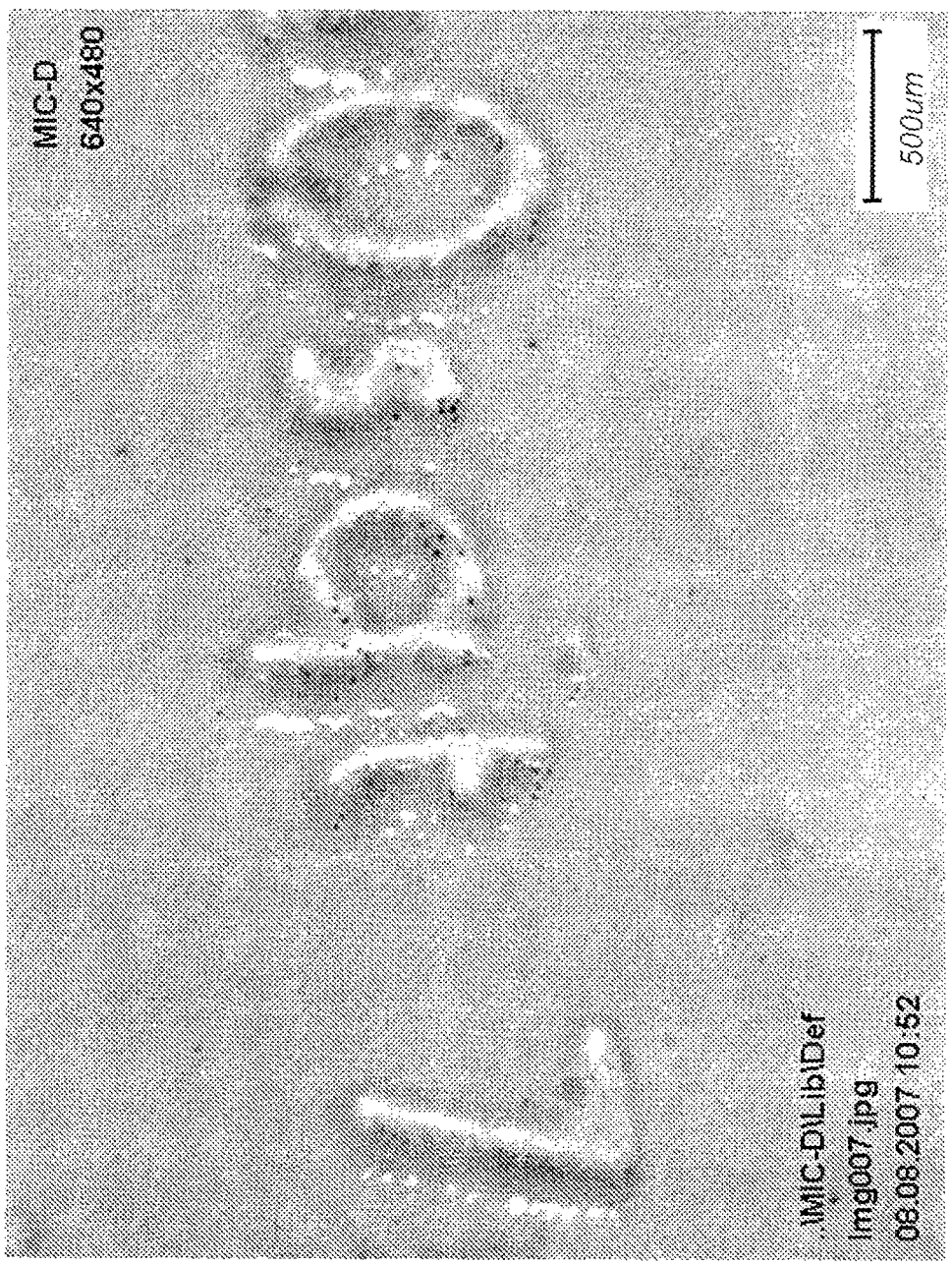
FIG. 9 is an optical micrograph of image showing the absence of carrier in the image area along with the larger size toner particles, here a 22 micron toner was used along with a 30 micron carrier.
Figure 10:
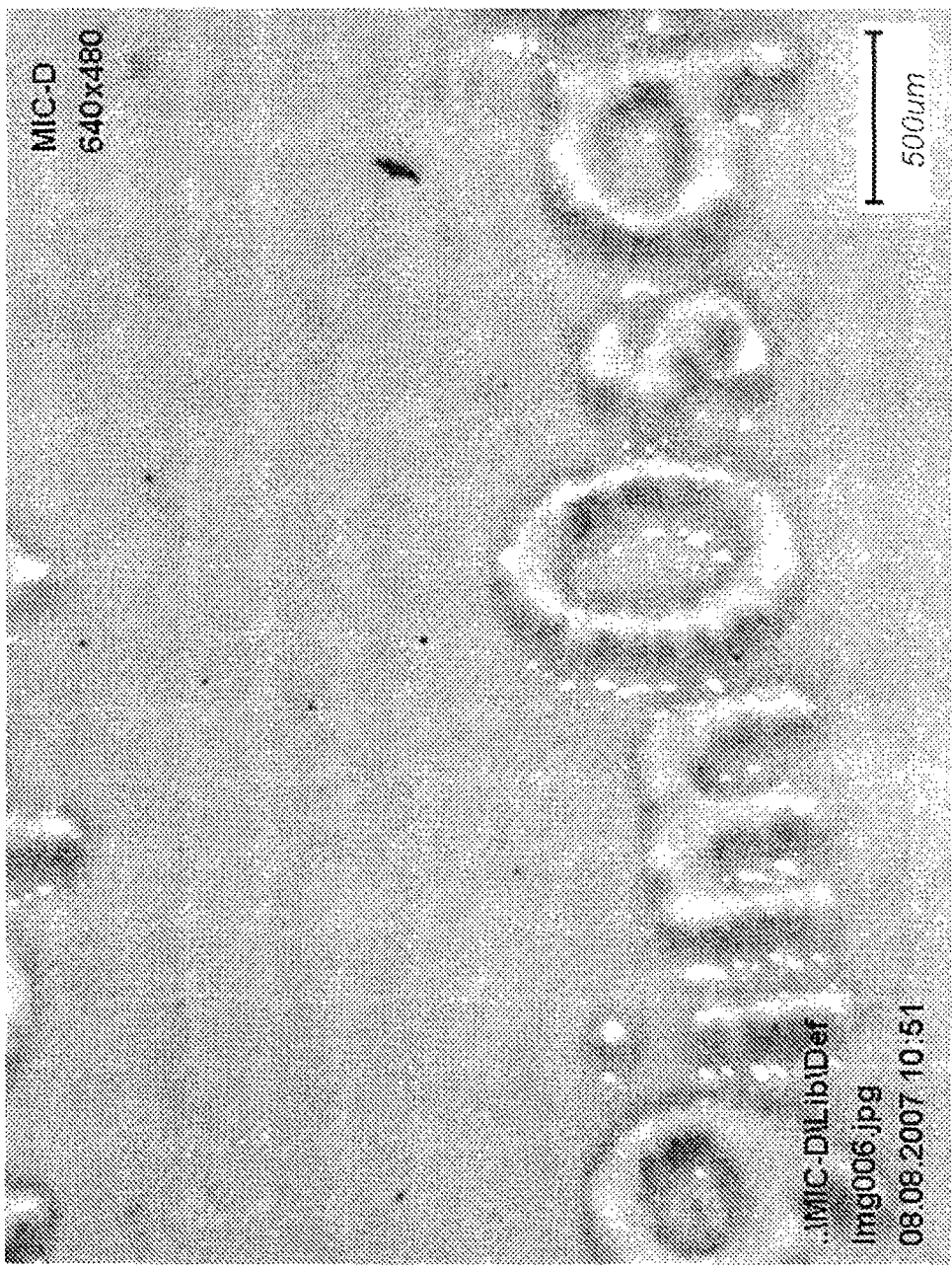
FIG. 10 is an optical micrograph of image showing the absence of carrier in the image area along with the larger size toner particles. A 22 micron toner was used along with a 40 micron carrier.

The printer testing results also indicated that a certain separation of toner and carrier particle size is necessary. When the differential in volume average diameter of carrier and toner was greater than 5 microns and the carrier particle was greater than 25 microns, or when the ratio of carrier-to-toner volume average diameter exceeded 1.25, or when the overlap of the volume weight particle size distribution was less than 35%, then no carrier was found in the image text during printer tests. As compared with the results in FIG. 1, text images shown in FIGS. 9 and 10 were prepared with the developer formulation of this invention. Further, if the size difference between the toner and carrier became too high, then dusting tended to increase because surface area available for charging tended to decrease. Therefore, in order to enable raised letter printing, it is necessary that the size constraints for both toner and carrier particle sizes be maintained for proper application of this invention as outlined herein.

The invention has been described in detail with particular reference to certain preferred embodiments thereof, but it will be understood that variations and modifications can be effected within the spirit and scope of the invention.

What is claimed is:

1. A developer for printing wherein raised information, with a controllable tactile effect, can be printed by electrographic techniques, the developer comprising:
    a) toner particles having a distribution of toner particle diameters according to a curve with a volume average diameter that is larger than 18 microns;
    b) carrier particles having a distribution of carrier particle diameters according to a curve with a volume average diameter larger than the toner particle volume average diameter and between 25 and 60 microns;
    c) wherein a size differential between the volume average diameter for the carrier particles and the volume average diameter for the toner particles is greater than 5 microns; and
    d) wherein there is distribution overlap of the toner distribution curve and carrier particle distribution curve that that is greater than or equal to 3% and less than 35%.

2. The developer according to claim 1, wherein the toner particles have an volume average particle size between 20 and 30 microns volume average diameter.

3. The developer according to claim 1, wherein the toner comprises a polymer resin as a polyester binder.

4. The developer according to claim 1, wherein the toner particles have a fineness index of particle size distribution of less than 1.5.

5. The developer according to claim 1, wherein the carrier has a volume average particle size more than 26 microns.

6. The developer according to claim 1, wherein the toner particles comprise hydrophobic particles of silica and/or titania.

7. The developer according to claim 1, wherein the toner particles comprises an optional wax-based release additive.

8. The developer according to claim 1, wherein the carrier particles comprise magnetic particles.

9. The developer according to claim 1, wherein the carrier particles comprise a volume average particle size of greater than 25 microns but less than 50 microns.

10. The developer according to claim 1, wherein the carrier particles comprise hard ferrites.

11. The developer according to claim 1, wherein the developer comprises a developer charge between −5 and −12 micro coulombs/gram.

12. The developer according to claim 1, wherein the developer comprises dust measurement values of less than 5 grams when the toner particles have a volume average particle size of at least 20 microns.

13. A developer for printing wherein raised information, with a controllable tactile effect, can be printed by electrographic techniques, developer comprising:
   a) toner particles having a distribution of toner particle diameters according to a curve with a volume average diameter that is larger than 18 microns;
   b) carrier particles having a distribution of carrier particle diameters according to a curve with a volume average diameter that is larger than the volume average diameter of the toner particle and that is between 25 and 60 microns;
   c) wherein a differential between the volume average diameter for the carrier particles and the volume average of the diameter for the toner particles is greater than 5 microns such that a ratio of carrier-to-toner volume average diameter exceeds 1.25; and
   d) wherein there is a distribution overlap of the toner distribution curve and carrier particle distribution curve that is greater than or equal to 3% and less than 35%.

\* \* \* \* \*